(12) United States Patent
Choi et al.

(10) Patent No.: US 11,343,042 B1
(45) Date of Patent: May 24, 2022

(54) METHOD FOR TRANSMITTING AND RECEIVING SOUNDING REFERENCE SIGNAL IN WIRELESS COMMUNICATION SYSTEM AND APPARATUS THEREFOR

(71) Applicant: LG ELECTRONICS INC., Seoul (KR)

(72) Inventors: Kukheon Choi, Seoul (KR); Jiwon Kang, Seoul (KR); Kyuseok Kim, Seoul (KR); Kilbom Lee, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 189 days.

(21) Appl. No.: 16/956,519

(22) PCT Filed: Dec. 21, 2018

(86) PCT No.: PCT/KR2018/016493
§ 371 (c)(1),
(2) Date: Jun. 19, 2020

(87) PCT Pub. No.: WO2019/125062
PCT Pub. Date: Jun. 27, 2019

Related U.S. Application Data

(60) Provisional application No. 62/609,306, filed on Dec. 21, 2017.

(51) Int. Cl.
*H04L 5/00* (2006.01)
*H04B 1/692* (2011.01)

(52) U.S. Cl.
CPC ........... *H04L 5/0048* (2013.01); *H04B 1/692* (2013.01)

(58) Field of Classification Search
CPC .............................. H04L 5/0048; H04B 1/692
See application file for complete search history.

(56) References Cited

U.S. PATENT DOCUMENTS 9,252,934 B2    2/2016  Hwang et al.
2013/0083683 A1*  4/2013  Hwang ................. H04L 5/0094
                                                            370/252

FOREIGN PATENT DOCUMENTS

KR       101426987       8/2014
KR       101525048       6/2015

OTHER PUBLICATIONS

PCT International Application No. PCT/KR2018/016493, International Search Report dated Apr. 16, 2019, 4 pages.

(Continued)

*Primary Examiner* — Steven H Nguyen
(74) *Attorney, Agent, or Firm* — Lee, Hong, Degerman, Kang & Waimey PC

(57) ABSTRACT

A method for transmitting and receiving a radio signal in a wireless communication system and a device therefor are disclosed. A method for receiving, by a base station, a sounding reference signal (SRS) in the wireless communication system includes transmitting, to a user equipment (UE), configuration information for transmission of the SRS; and receiving, from the UE, the SRS transmitted based on the configuration information. The configuration information includes group hopping information and sequence hopping information for sequence hopping of the SRS. A sequence length of the SRS is based on a product of a number of candidates of the group hopping information and a number of candidates of the sequence hopping information. The number of candidates of the group hopping information and the number of candidates of the sequence (Continued)

hopping information are configured based on a number of neighboring cells of the base station.

15 Claims, 15 Drawing Sheets

(56)     References Cited

OTHER PUBLICATIONS

Mitsubishi Electric, "Views on SRS Designs," 3GPP TSG-RAN WG1 #91, R1-1719519, Nov. 2017, 7 pages.
Ericsson, "Remaining Details on SRS Design," 3GPP TSG-RAN WG1 #91, R1-1720744, Nov. 2017, 10 pages.
European Patent Office Application Serial No. 18891206.7, Search Report dated Aug. 3, 2021, 9 pages.
Ericsson, "Details on SRS design," 3GPP TSG-RAN WG1 NR Ad Hoc #3, R2-1716374, Sep. 2017, 9 pages.
Ericsson, "Remaining details on SRS design," 3GPP TSG RAN WG1 Meeting 91, R1-1721384, Dec. 2017, 12 pages.

\* cited by examiner

【Figure 1】
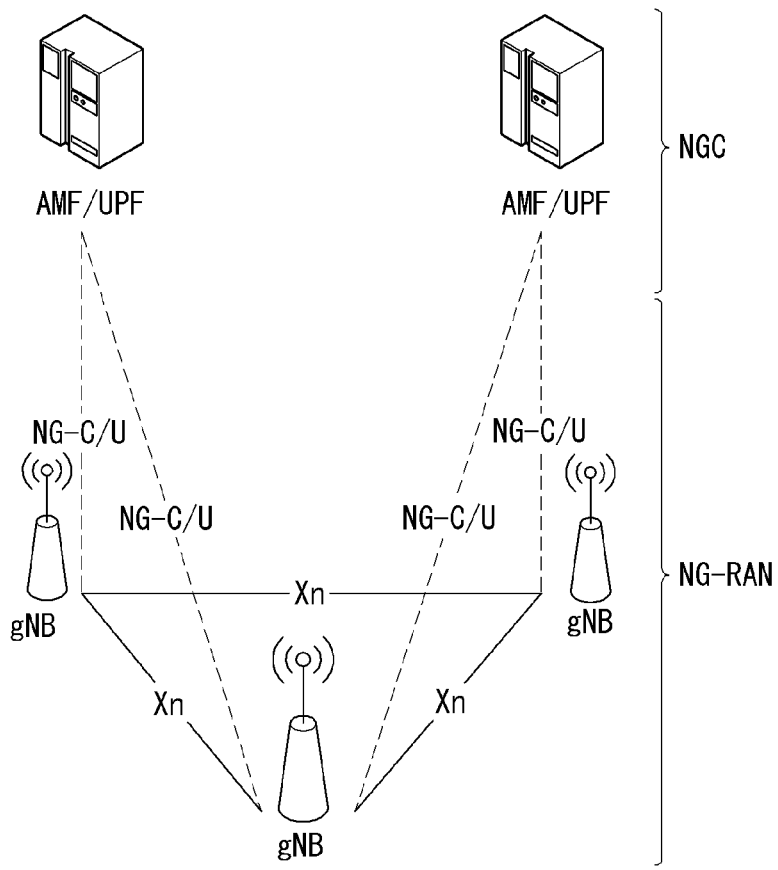
【Figure 2】
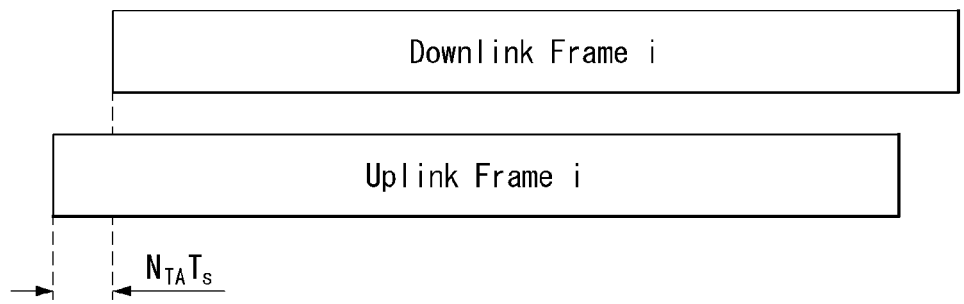

[Figure 3]
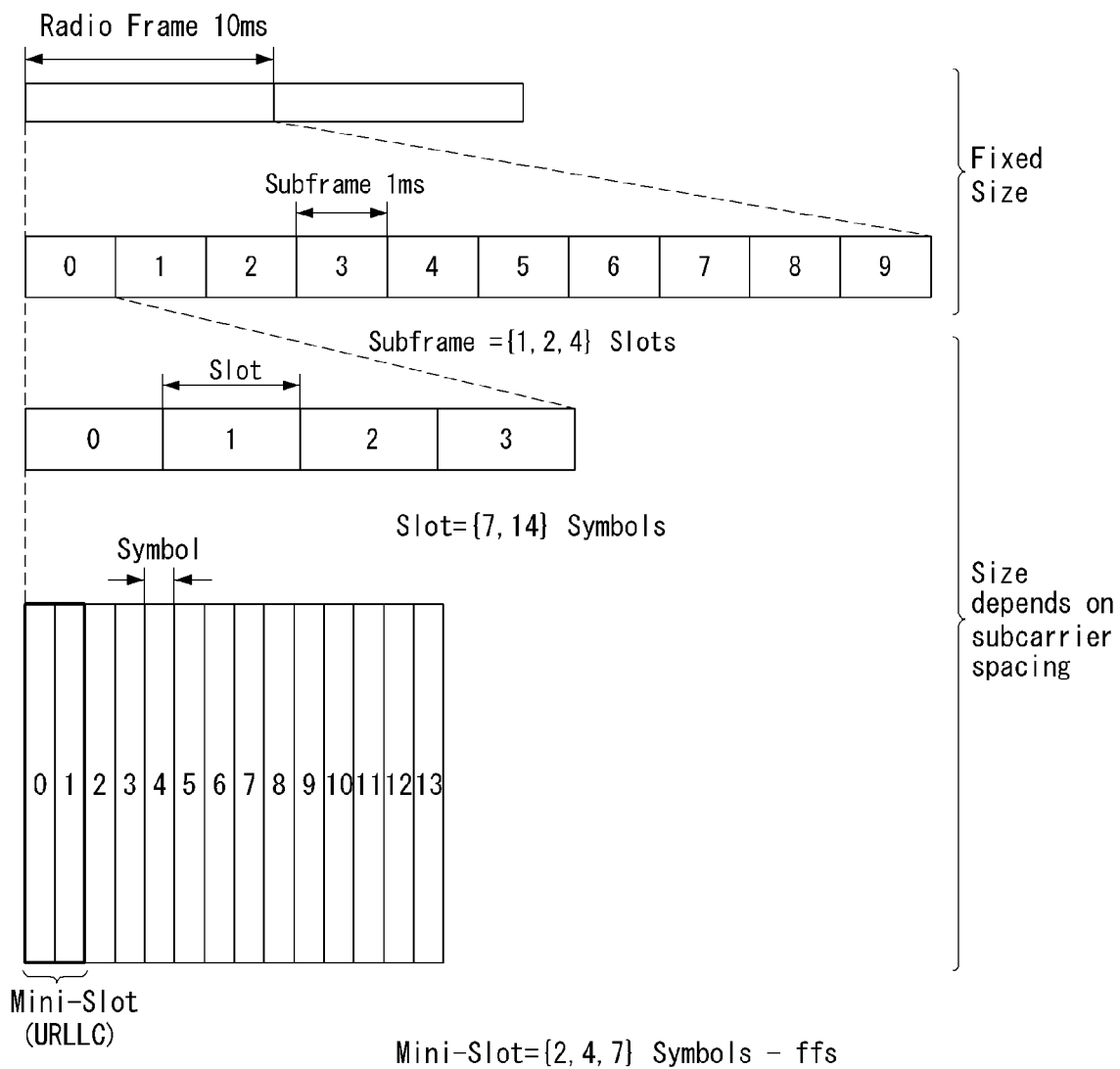

[Figure 4]
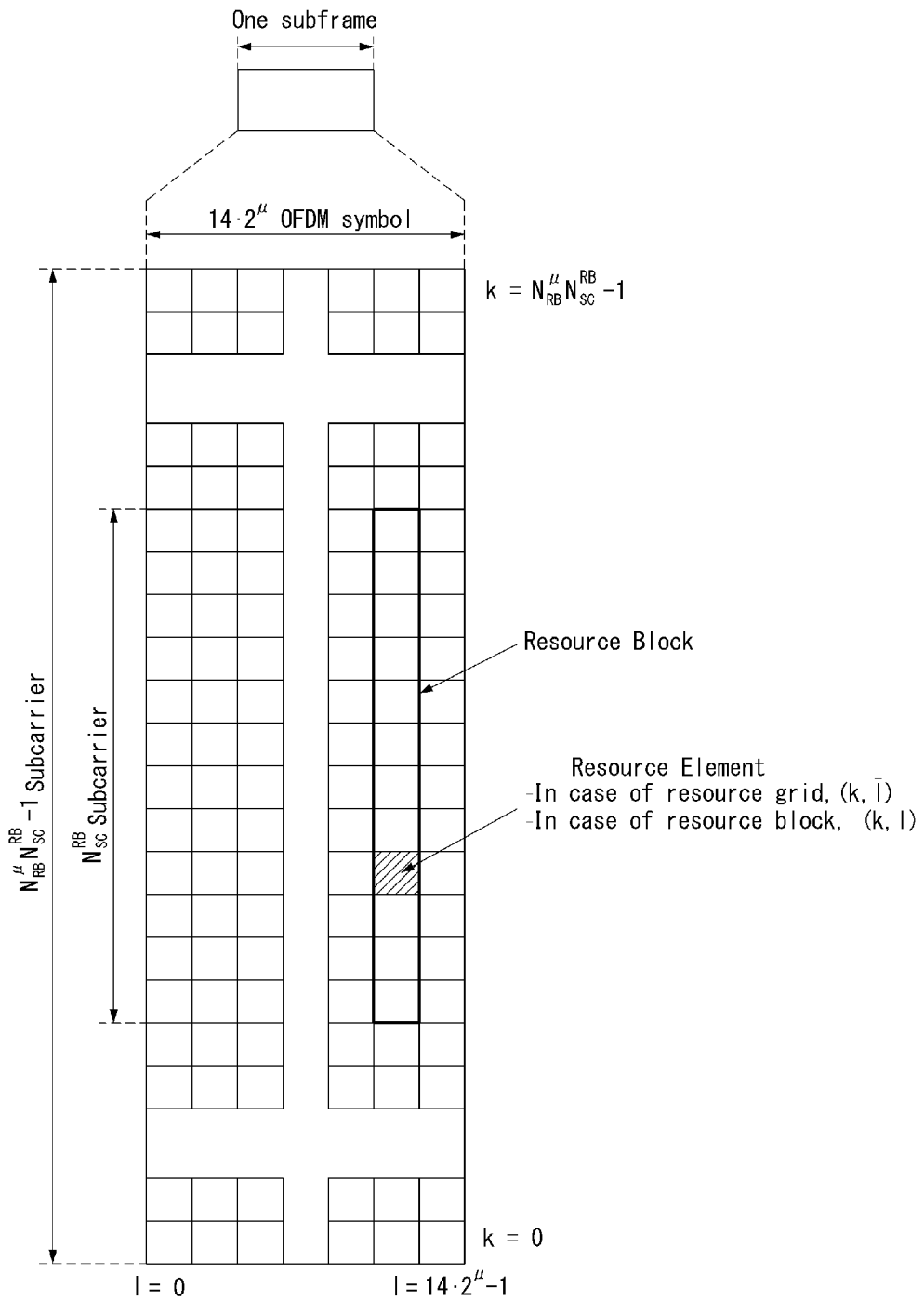

【Figure 5】
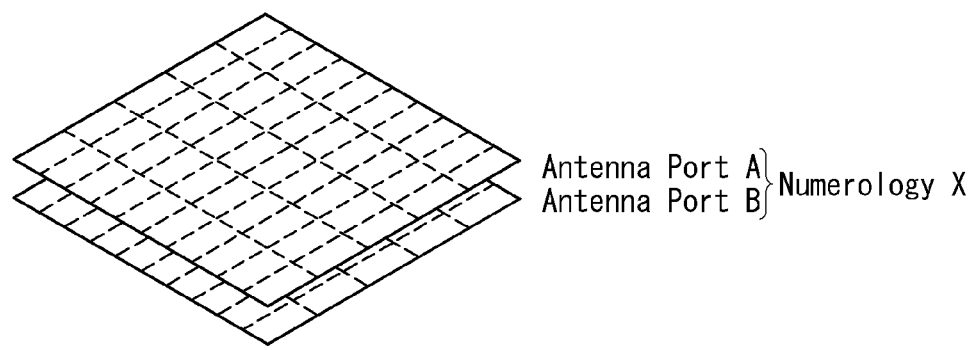
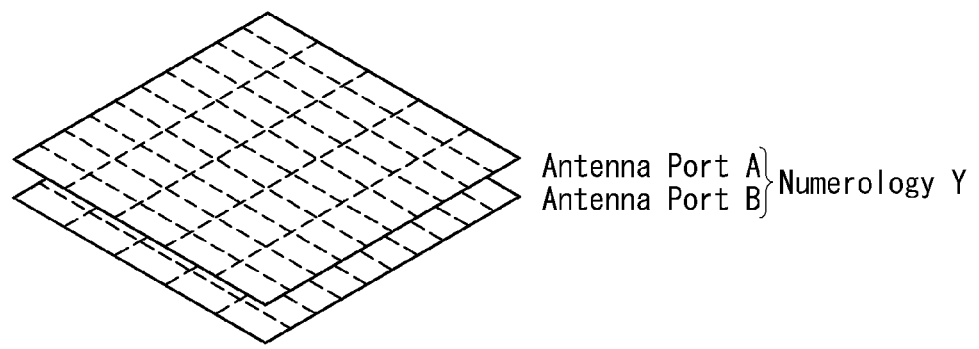

[Figure 6]
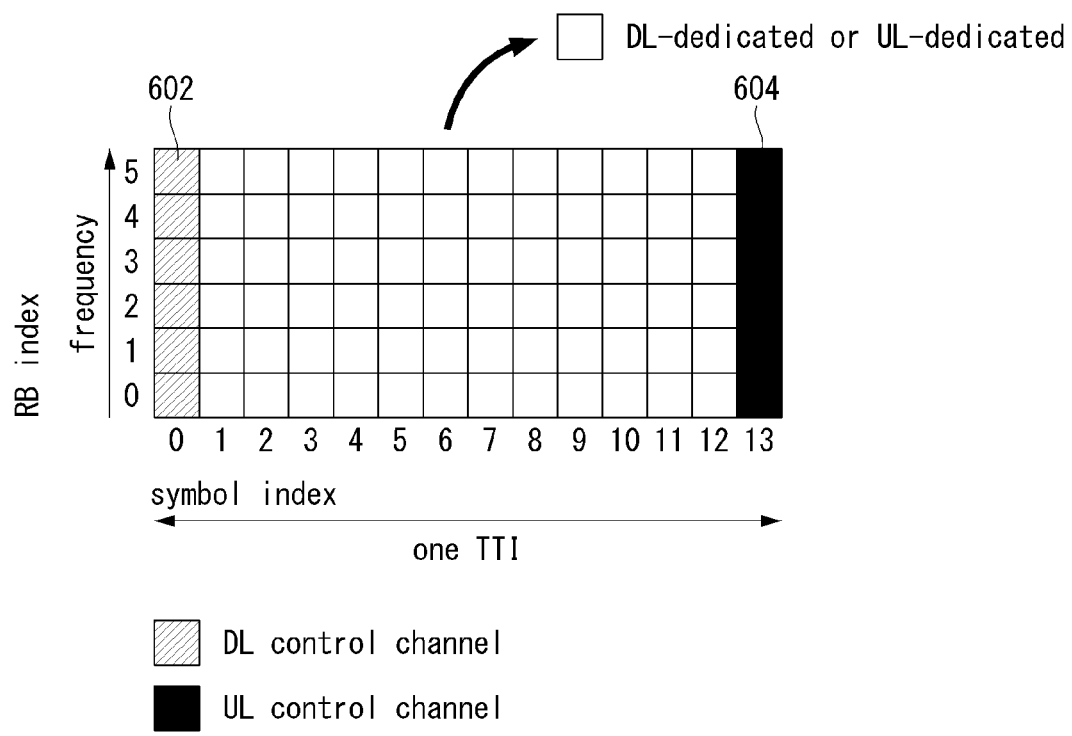

【Figure 7】
(a)
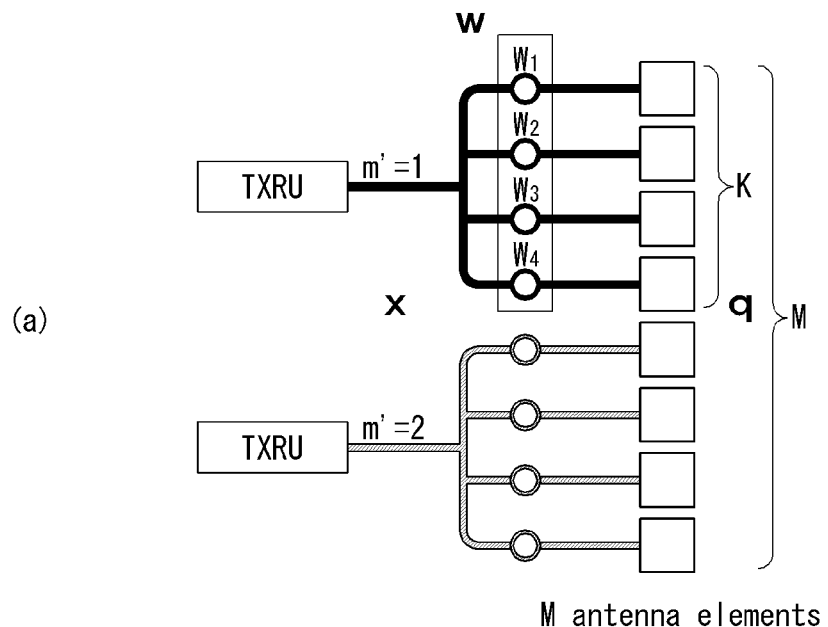
(b)
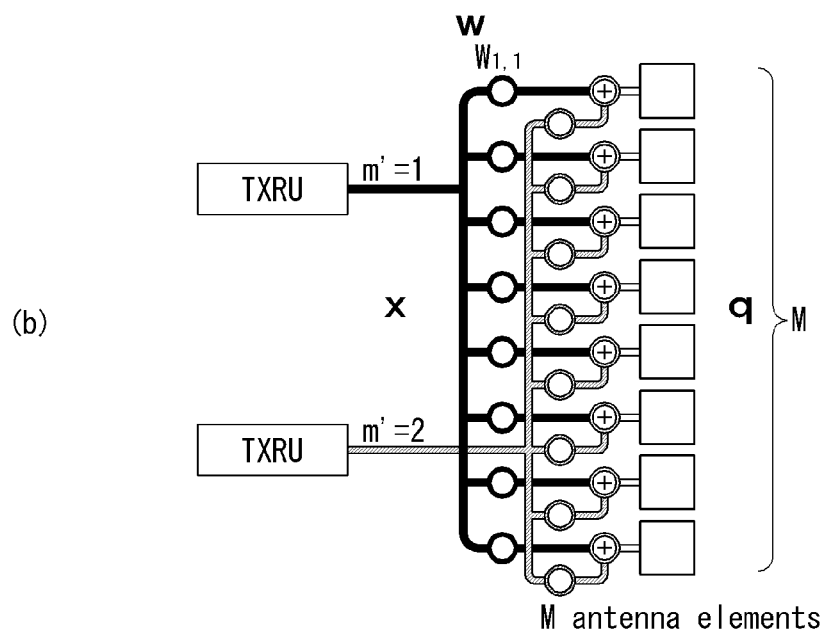

【Figure 8】
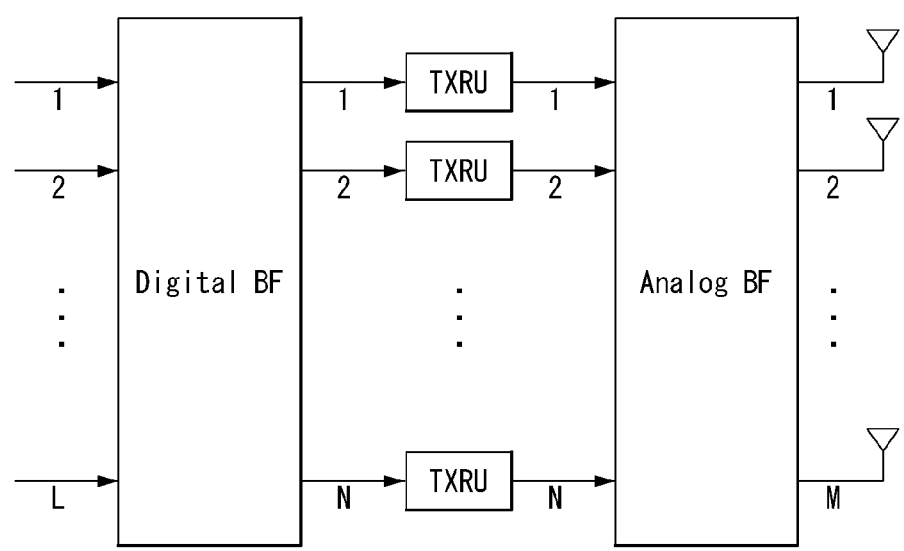

【Figure 9】
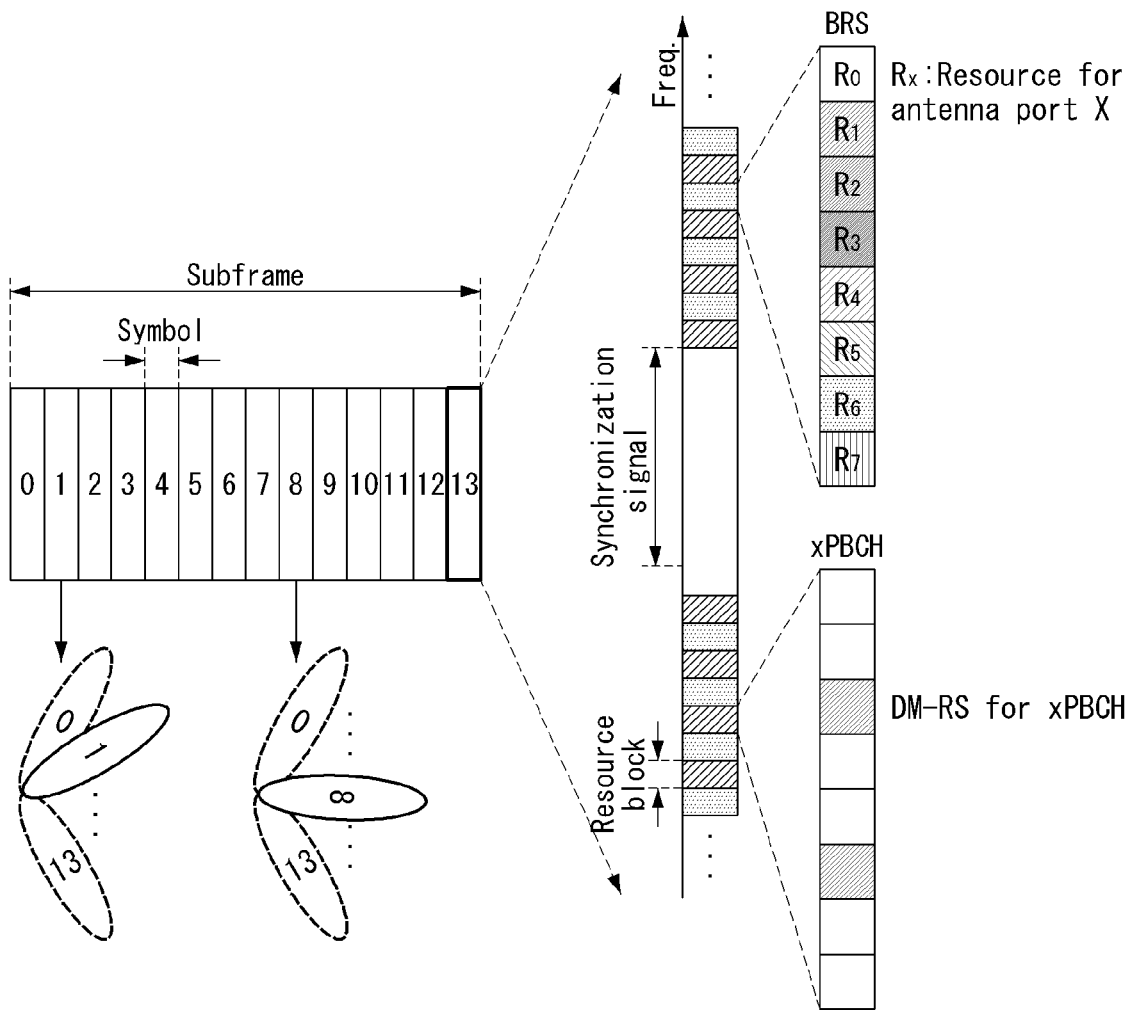

[Figure 10]
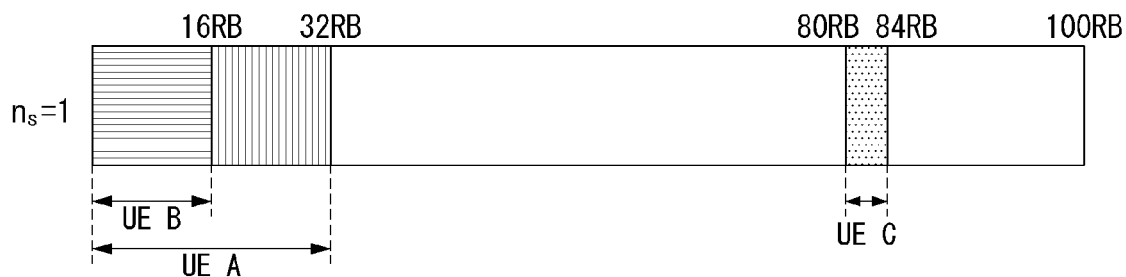

【Figure 11】
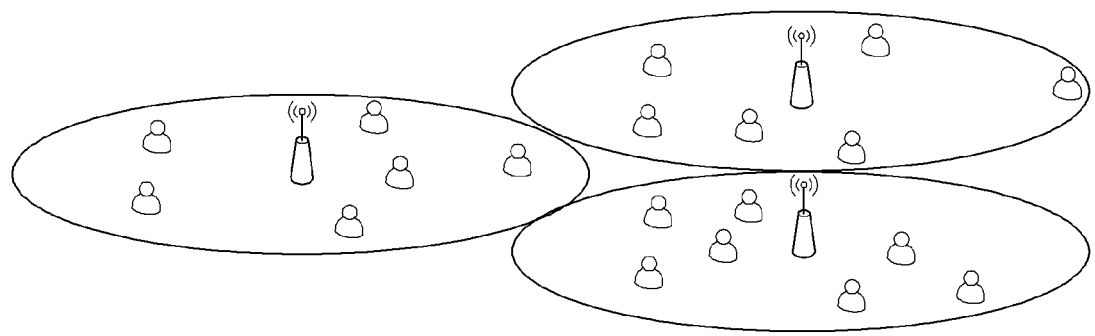
△ : UE
📡 : Base station
(a)
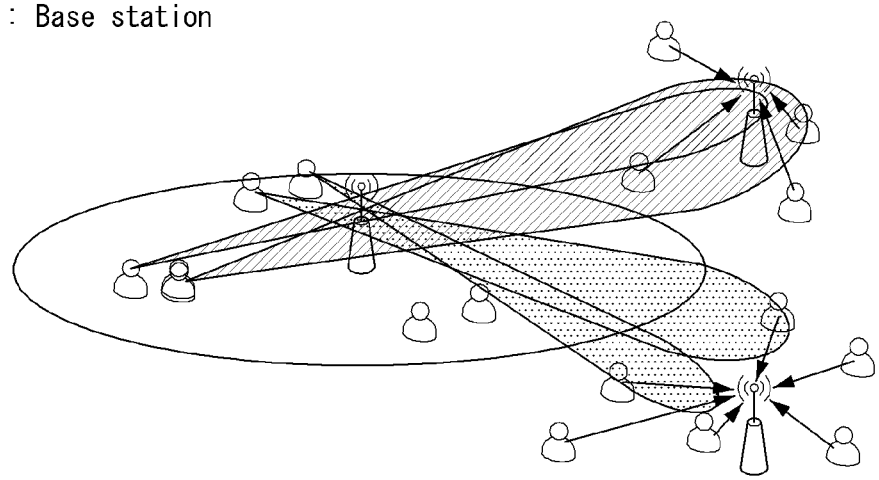
(b)

【Figure 12】
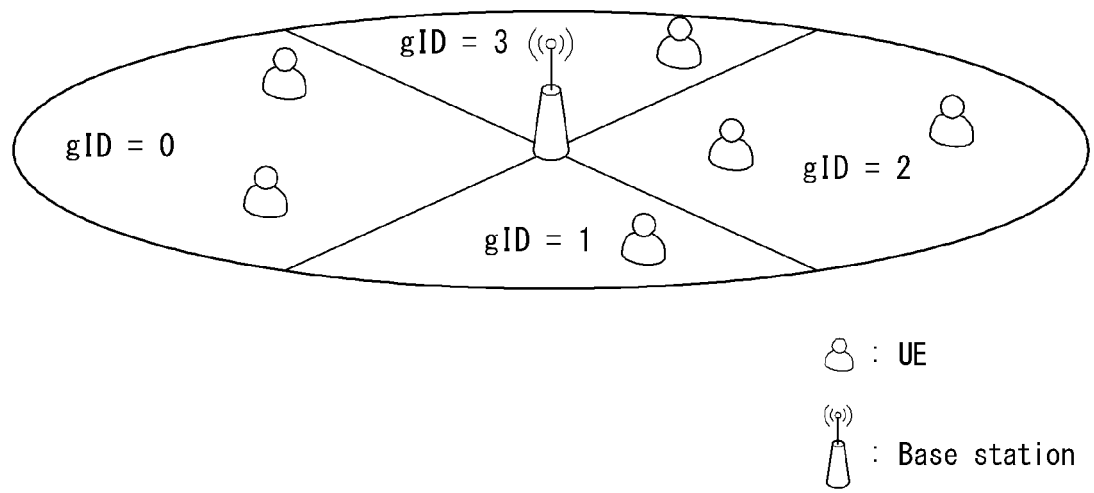
【Figure 13】
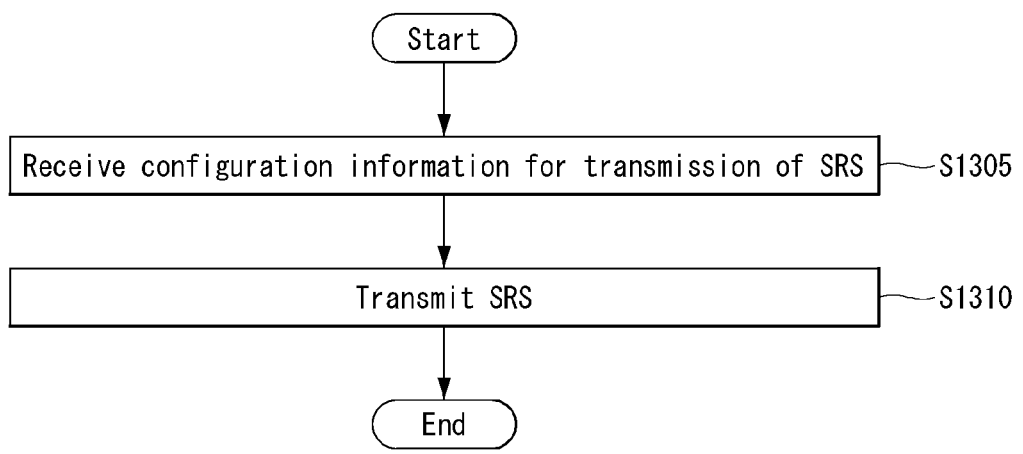

[Figure 14]
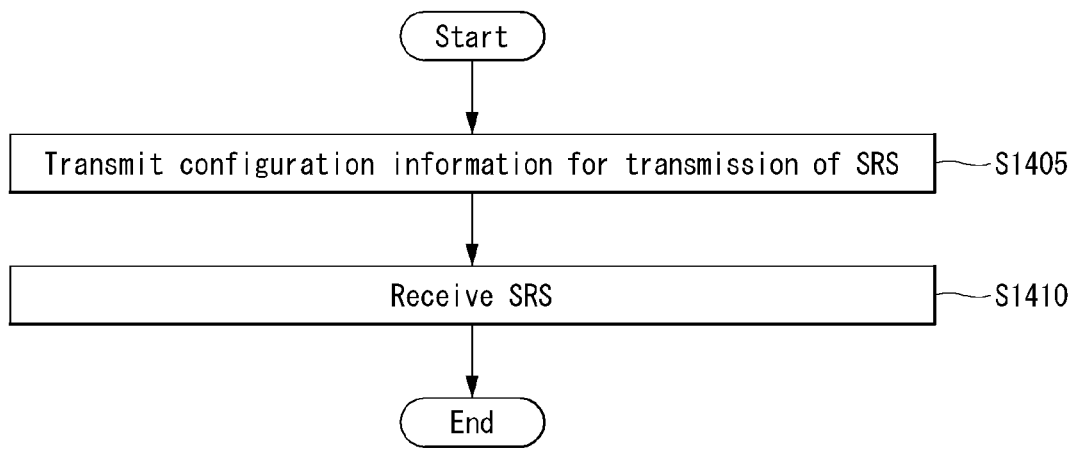
[Figure 15]
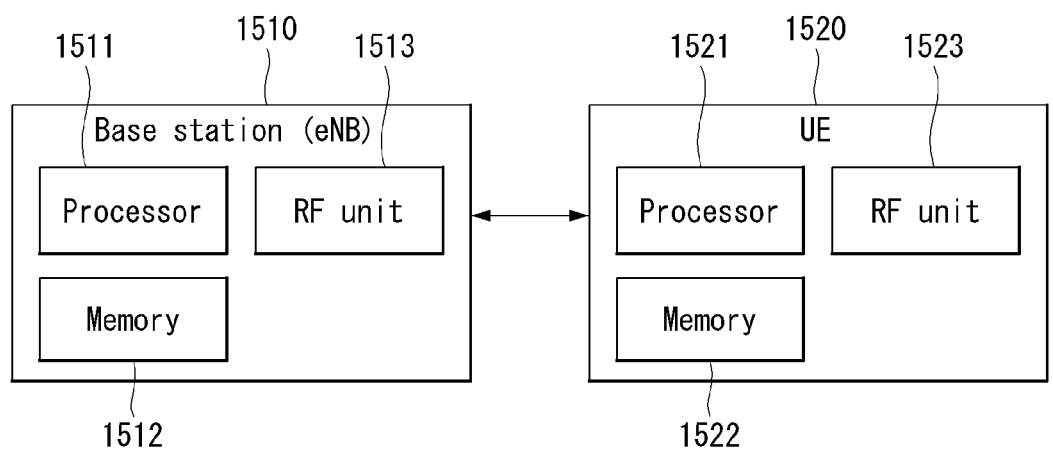

[Figure 16]
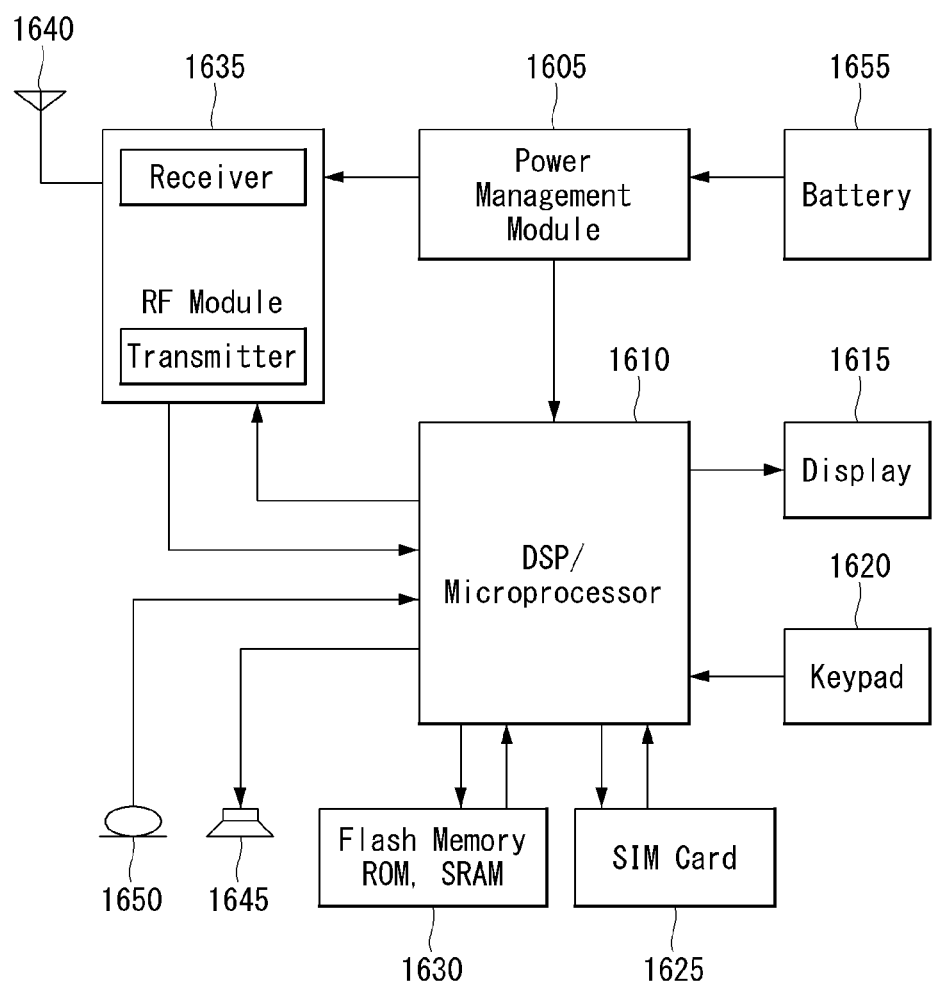

【Figure 17】
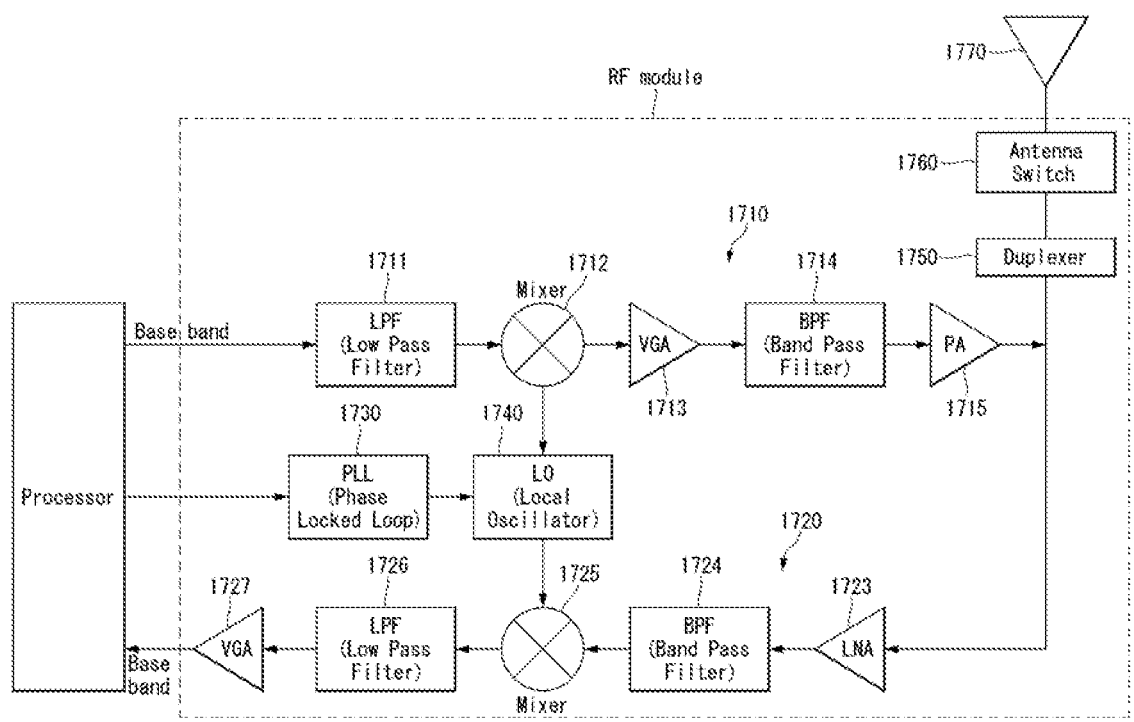

【Figure 18】
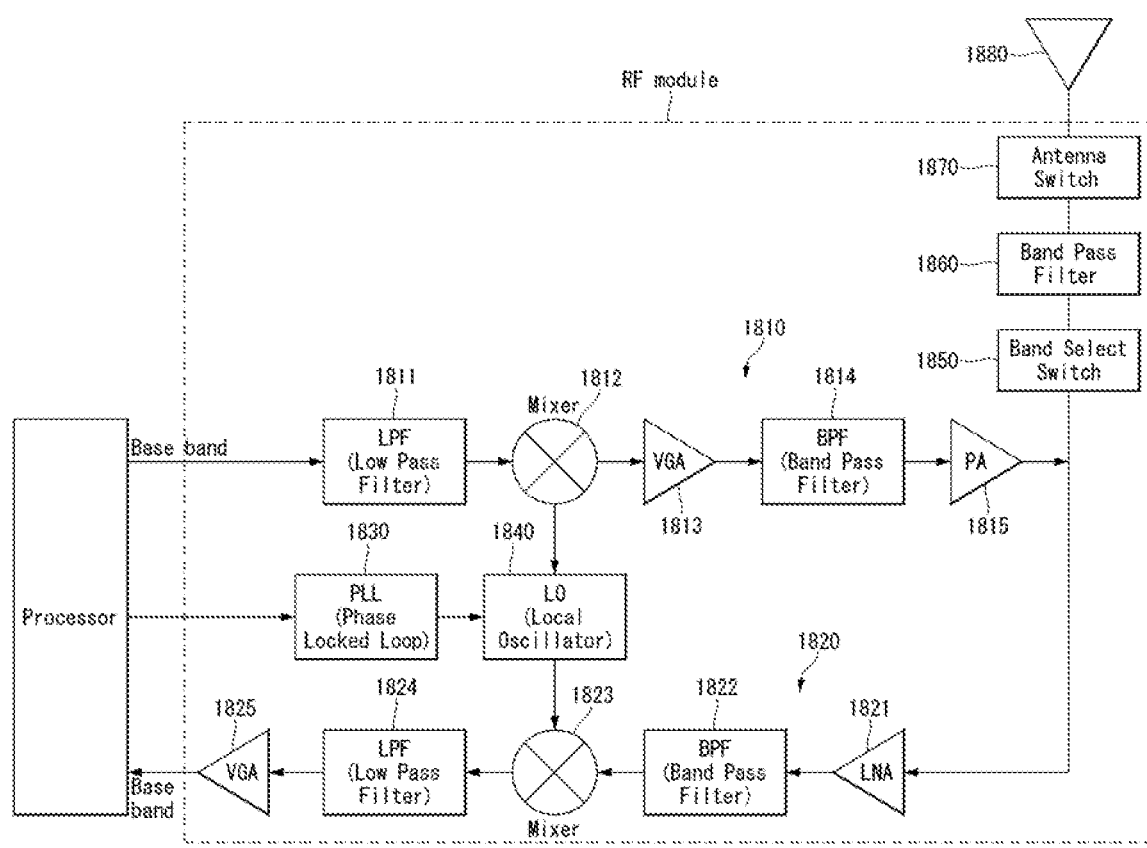

METHOD FOR TRANSMITTING AND RECEIVING SOUNDING REFERENCE SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/016493, filed on Dec. 21, 2018, which claims the benefit of U.S. Provisional Application No. 62/609,306, filed on Dec. 21, 2017, the contents of which are all hereby incorporated by reference herein in their entirety.

TECHNICAL FIELD

The present disclosure relates to a wireless communication system, and more particularly to a method for transmitting and receiving a sounding reference signal and a device supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present disclosure proposes a method for transmitting and receiving a sounding reference signal (SRS) in a wireless communication system.

More specifically, the present disclosure proposes a method of configuring a group hopping number and/or a sequence hopping number in relation to generation and/or hopping of a sequence for a SRS transmission.

The technical problems to be solved by the present disclosure are not limited by the above-mentioned technical problems, and other technical problems which are not mentioned above can be clearly understood from the following description by those skilled in the art to which the present disclosure pertains.

Technical Solution

In one aspect, there is provided a method for receiving, by a base station, a sounding reference signal (SRS) in a wireless communication system, the method comprising transmitting, to a user equipment (UE), configuration information for a transmission of the SRS; and receiving, from the UE, the SRS transmitted based on the configuration information, wherein the configuration information includes group hopping information and sequence hopping information for a sequence hopping of the SRS, wherein a sequence length of the SRS is based on a product of a number of candidates of the group hopping information and a number of candidates of the sequence hopping information, wherein the number of candidates of the group hopping information and the number of candidates of the sequence hopping information are configured based on a number of neighboring cells of the base station.

The number of candidates of the sequence hopping information configured when the number of neighboring cells of the base station is equal to or greater than a preset value may be configured to be greater than the number of candidates of the sequence hopping information configured when the number of neighboring cells of the base station is less than a preset value.

The number of candidates of the group hopping information configured when the number of neighboring cells of the base station is equal to or greater than the preset value may be configured to be less than the number of candidates of the group hopping information configured when the number of neighboring cells of the base station is less than a preset value.

The method may further comprise transmitting, to the UE, a UE group identifier related to the sequence hopping of the SRS. An initial value of a scrambling sequence for the sequence hopping of the SRS may be configured based on the UE group identifier.

The UE group identifier may be configured depending on a received power for an uplink transmission of the UE among a plurality of candidates.

The UE group identifier may be configured depending on a sector of the base station, on which the UE is located, among a plurality of candidates.

The method may further comprise transmitting, to the UE, a specific downlink reference signal, and receiving, from the UE, feedback information generated based on the downlink reference signal. The UE group identifier may be determined based on the feedback information.

The feedback information may be at least one of the UE group identifier, a received power measured by the downlink reference signal, and a SRS resource indicator (SRI) related to the downlink reference signal.

The SRS resource indicator may represent a resource of the SRS having a spatial quasi-co-location (QCL) association with the downlink reference signal.

The group hopping information and the sequence hopping information may be respectively configured based on a group hopping pattern and a sequence hopping pattern according to a slot index and a symbol index.

The group hopping pattern and the sequence hopping pattern may be configured for the UE via a higher layer signaling.

In another aspect, there is provided a base station receiving a sounding reference signal (SRS) in a wireless communication system, the base station comprising a radio frequency (RF) unit configured to transmit and receive a radio signal; and a processor functionally connected to the RF unit, wherein the processor is configured to transmit, to a user equipment (UE), configuration information for a transmission of the SRS; and receive, from the UE, the SRS transmitted based on the configuration information, wherein the configuration information includes group hopping information and sequence hopping information for a sequence hopping of the SRS, wherein a sequence length of the SRS is based on a product of a number of candidates of the group hopping information and a number of candidates of the sequence hopping information, wherein the number of candidates of the group hopping information and the number of candidates of the sequence hopping information are configured based on a number of neighboring cells of the base station.

In another aspect, there is provided a user equipment (UE) transmitting a sounding reference signal (SRS) in a wireless communication system, the UE comprising a radio frequency (RF) unit configured to transmit and receive a radio signal; and a processor functionally connected to the RF unit, wherein the processor is configured to receive, from a base station, configuration information for a transmission of the SRS; and transmit, to the base station, the SRS based on the configuration information, wherein the configuration information includes group hopping information and sequence hopping information for a sequence hopping of the SRS, wherein a sequence length of the SRS is based on a product of a number of candidates of the group hopping information and a number of candidates of the sequence hopping information, wherein the number of candidates of the group hopping information and the number of candidates of the sequence hopping information are configured based on a number of neighboring cells of the base station.

The processor may be configured to receive, from the base station, a UE group identifier related to the sequence hopping of the SRS. An initial value of a scrambling sequence for the sequence hopping of the SRS may be configured based on the UE group identifier.

The group hopping information and the sequence hopping information may be respectively configured based on a group hopping pattern and a sequence hopping pattern according to a slot index and a symbol index.

Advantageous Effects

Embodiments of the present disclosure can reduce inter-cell interference efficiently and adaptively when configuring a group hopping number (i.e., sequence group hopping number) and a sequence hopping number (i.e., base sequence number) for SRS sequence transmission.

Embodiments of the present disclosure can increase randomization of inter-cell interference and reduce the inter-cell interference through a SRS sequence generated based on a group hopping number and a sequence hopping number configured according to embodiments of the present disclosure.

Embodiments of the present disclosure can flexibly configure a group hopping number and a sequence hopping number of respective cells according to situations of the network.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 illustrates an example of an overall structure of a new radio (NR) system according to some implementations of the present disclosure.

FIG. 2 illustrates an example of a relationship between an uplink (UL) frame and a downlink (DL) frame in a wireless communication system according to some implementations of the present disclosure.

FIG. 3 illustrates an example of a frame structure in an NR system.

FIG. 4 illustrates an example of a resource grid supported in a wireless communication system according to implementations of the present disclosure.

FIG. 5 illustrates examples of resource grids for each antenna port and numerology according to implementations of the present disclosure.

FIG. 6 illustrates an example of a self-contained structure according to implementations of the present disclosure.

FIG. 7 illustrates a transceiver unit model in a wireless communication system to which a method proposed in the present disclosure is applicable.

FIG. 8 illustrates a hybrid beamforming structure from the point of view of TXRU and physical antenna in a wireless communication system to which a method proposed in the present disclosure is applicable.

FIG. 9 illustrates an example of a beam sweeping operation for a synchronization signal and system information.

FIG. 10 illustrates an example of a method of configuring a sounding reference signal (SRS) hopping pattern in a LTE system.

FIG. 11 illustrates examples of network deployment of an existing system and a NR system.

FIG. 12 illustrates an example of classifying UE group sequence IDs based on a location of a UE.

FIG. 13 is a flow chart illustrating an operation of a UE transmitting a SRS in a wireless communication system to which a method described in the present disclosure is applicable.

FIG. 14 is a flow chart illustrating an operation of a UE transmitting a SRS in a wireless communication system to which a method described in the present disclosure is applicable.

FIG. 15 illustrates a block configuration diagram of a wireless communication device to which methods described in the present disclosure are applicable.

FIG. 16 illustrates a block configuration diagram of a communication device according to an embodiment of the present disclosure.

FIG. 17 illustrates an example of a RF module of a wireless communication device to which a method described in the present disclosure is applicable.

FIG. 18 illustrates another example of a RF module of a wireless communication device to which a method described in the present disclosure is applicable.

MODE FOR INVENTION

Some implementations of the present disclosure are described in detail with reference to the accompanying drawings. A detailed description to be disclosed along with the accompanying drawings is intended to describe some exemplary implementations of the present disclosure and is not intended to describe a sole implementation of the present disclosure. The following detailed description includes more details in order to provide full understanding of the present disclosure. However, those skilled in the art will understand that the present disclosure may be implemented without such more details.

In some cases, in order to prevent a concept of the present disclosure from being ambiguous, known structures and devices may be omitted or illustrated in a block diagram format based on core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or generation NB (general NB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Implementations of the present disclosure may be supported by the standard documents disclosed in at least one of IEEE 802, 3GPP, or 3GPP2, that is, radio access systems. That is, one or more features or portions of the implementations of the present disclosure may be implemented in accordance with such standard documents, even if those specific features or portions are not expressly disclosed herein. Furthermore, terms that are used in this document may be described by the standard documents.

In the implementations described herein, 3GPP LTE/LTE-A/New RAT (NR) is chiefly described, but the technical characteristics of the present disclosure are not limited thereto.

As propagation of smart phones and Internet of things (IoT) terminals rapidly spreads, the amount of information which is transmitted and received through a communication network increases. Accordingly, in the next generation wireless access technology, an environment (e.g., enhanced mobile broadband communication) that provides a faster service to more users than existing communication systems (or existing radio access technology) needs to be considered.

To this end, a design of a communication system that considers machine type communication (MTC) providing a service by connecting multiple devices and objects is discussed. Further, a design of a communication system (e.g., Ultra-Reliable and Low Latency Communication (URLLC)) considering a service and/or a user equipment sensitive to reliability and/or latency of communication is also discussed.

Hereinafter, in this specification, for easy description, the next-generation wireless access technology is referred to as a new radio access technology (RAT) (NR) radio access technology and the wireless communication system to which the NR is applied is referred to as an NR system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 illustrates an example of an overall structure of a new radio (NR) system according to some implementations of the present disclosure.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

The numerology may be configured such that time/frequency granularity is dynamically allocated according to respective services (e.g., eMBB, URLLC, mMTC, etc.) and scenarios (e.g., high speed, etc.).

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$ DL and UL transmission is configured as a radio frame having a section of $T_f = (\Delta f_{max} N_f/100) \cdot T_s = 10$ ms. The radio frame is composed of ten subframes each having a section of $T_{sf} = (\Delta f_{max} N_f/1000) \cdot T_s = 1$ ms. In this case, there may be a set of UL frames and a set of DL frames.

FIG. 2 illustrates an example of a relationship between an uplink (UL) frame and a downlink (DL) frame in a wireless communication system according to some implementations of the present disclosure.

As illustrated in FIG. 2, a UL frame number I from a User Equipment (UE) needs to be transmitted $T_{TA} = N_{TA} T_s$ before the start of a corresponding DL frame in the UE.

Regarding the numerology $\mu$, slots are numbered in ascending order of $n_s^\mu \in \{0, \ldots, N_{subframe}^{slots, \mu} - 1\}$ in a subframe, and in ascending order of $n_{s,f}^\mu \in \{0, \ldots, N_{frame}^{slots, \mu} - 1\}$ in a radio frame. One slot is composed of continuous OFDM symbols of $N_{symb}^\mu$ and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number ($N_{symb}^{slot}$) of OFDM symbols per slot, the number ($N_{slot}^{frame,\mu}$) of slots per radio frame, and the number ($N_{slot}^{subframe,\mu}$) of slots per subframe in normal CP, and Table 3 shows the number of OFDM symbols per slot, the number of slots per radio frame, and the number of slots per subframe in extended CP.

TABLE 2

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example frame structure in an NR system. FIG. 3 is intended merely for illustration purposes but not for limiting the scope of the disclosure.

Table 3 represents an example where $\mu=2$, i.e., the subcarrier spacing (SCS) is 60 kHz. Referring to Table 2, one subframe (or frame) may include four slots. The "1 subframe={1,2,4} slots" in FIG. 3 is an example, and the number of slots that may be included in one subframe may be defined as shown in Table 2.

The mini-slot may consist of 2, 4, or 7 symbols or more or less symbols.

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) association. Herein, the large-scale properties may include at least one of delay spread, Doppler spread, Frequency shift, average received power, and Received Timing.

FIG. 4 illustrates an example of a resource grid supported in a wireless communication system according to implementations of the present disclosure.

Referring to FIG. 4, a resource grid is composed of $N_{RB}^\mu N_{sc}^{RB}$ subcarriers in a frequency domain, each subframe composed of $14 \cdot 2\mu$ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \leq N_{RB}^{max,\mu}$ The above RB indicates the maximum transmission bandwidth, and it may change not just between numerologies, but between UL and DL.

In this case, as illustrated in FIG. 5, one resource grid may be configured for the numerology $\mu$ and an antenna port p.

FIG. 5 illustrates examples of resource grids for each antenna port and numerology according to implementations of the present disclosure.

Each element of the resource grid for the numerology μ and the antenna port p is indicated as a resource element, and may be uniquely identified by an index pair (k,l). Herein, k=0, . . . , $N_{RB}^{\mu} N_{sc}^{RB}-1$ is an index in the frequency domain, and l=0 . . . , $2^{\mu} N_{symb}^{\mu}-1$ indicates a location of a symbol in a subframe. To indicate a resource element in a slot, the index pair (k,l) is used. Herein, l=0, . . . , $N_{symb}^{\mu}-1$.

The resource element (k,l) for the numerology μ and the antenna port p corresponds to a complex value $a_{k,l}^{(p,\mu)}$. When there is no risk of confusion or when a specific antenna port or numerology is specified, the indexes p and μ may be dropped and thereby the complex value may become $a_{k,l}^{(p)}$ or $a_{k,l}$.

The physical resource block is defined with $N_{sc}^{RB}=12$ consecutive subcarriers in the frequency domain.

Point A plays a role as a common reference point of the resource block grid and may be obtained as follows.

offsetToPointA for PCell downlink refers to the frequency offset between point A and the lowest subcarrier of the lowest resource block overlapping the SS/PBCH block used by the UE for initial cell selection and is represented with resource block units assuming a subcarrier interval of 15 kHz for FR1 and a subcarrier interval of 60 kHz for FR2;

absoluteFrequencyPointA refers to the frequency-position of point A expressed as in the absolute radio-frequency channel number (ARFCN).

The common resource blocks are numbered up from zero in the frequency domain for subcarrier spacing configuration μ.

The center of subcarrier 0 of common resource block 0 for subcarrier spacing configuration μ matches 'point A.'. In the frequency domain, resource elements (k,l) for common resource block number $n_{CRB}^{\mu}$ and subcarrier spacing configuration μ may be given as Equation 1 below.

$$n_{CRB}^{\mu} = \left\lfloor \frac{k}{N_{sc}^{RB}} \right\rfloor \quad \text{[Equation 1]}$$

Here, k may be defined relative to point A so that k=0 corresponds to the subcarrier with point A centered. The physical resource blocks are numbered from 0 to $N_{BWP,i}^{size}-1$ in the bandwidth part (BWP), and i is the number of the BWP. In BWP i, the relationship between physical resource block $n_{PRB}$ and common resource block $n_{CRB}$ may be given as Equation 2 below.

$$n_{CRB} = n_{PRB} + N_{BWP,i}^{start} \quad \text{[Equation 2]}$$

Here, $N_{BWP,i}^{start}$ may be common resource blocks in which the BWP starts relative to common resource block 0.

Self-Contained Structure

A time division duplexing (TDD) structure considered in an NR system is a structure in which both uplink (UL) and downlink (DL) are processed in one subframe. This is for minimizing the latency of data transmission in the TDD system, and this structure is referred to as a self-contained subframe structure.

FIG. 6 illustrates one example of a self-contained structure according to implementations of the present disclosure. FIG. 6 is shown as an example, and does not limit the scope of the present disclosure.

Referring to FIG. 6, it is assumed that one transmission unit (e.g., slot or subframe) is constituted by 14 orthogonal frequency division multiplexing (OFDM) symbols as in legacy LTE.

In FIG. 6, a region 602 refers to a downlink control region and a region 604 refers to an uplink control region. Further, a region (that is, a region without a separate indication) other than the regions 602 and 604 may be used for transmitting downlink data or uplink data.

That is, uplink control information and downlink control information may be transmitted in one self-contained slot. On the contrary, in the case of data, the uplink data or downlink data may be transmitted in one self-contained slot.

When the structure illustrated in FIG. 6 is used, in one self-contained slot, downlink transmission and uplink transmission may sequentially proceed and transmission of the downlink data and reception of uplink ACK/NACK may be performed.

Consequently, when an error of data transmission occurs, a time required for retransmitting data may be reduced. Therefore, latency associated with data delivery may be minimized.

In the self-contained slot structure illustrated in FIG. 6, a time gap for a process of switching from a transmission mode to a reception mode in a base station (eNodeB, eNB, or gNB) and/or a terminal (user equipment (UE)) or a process of switching from the reception mode to the transmission mode is required. In association with the time gap, when the uplink transmission is performed after the downlink transmission in the self-contained slot, some OFDM symbol(s) may be configured as a guard period (GP).

PUCCH Format in NR System

In the NR system, multiple PUCCH formats may be defined by a duration and/or a payload size. For example, the following Table 4 represents PUCCH formats considered in the NR system.

TABLE 4

| Format | PUCCH length in OFDM symbols | Number of bits | [Usage] | Etc. |
|---|---|---|---|---|
| 0 | 1-2 | ≤2 | HARQ, SR | Sequence selection |
| 1 | 4-14 | ≤2 | HARQ, [SR] | Sequence modulation (BPSK, QPSK) |
| 2 | 1-2 | >2 | HARQ, CSI, [SR] | [CP-OFDM] |
| 3 | 4-14 | [>N] | HARQ, CSI, [SR] | DFT-s-OFDM (no UE multiplexing) |
| 4 | 4-14 | >2, [≤N] | HARQ, CSI, [SR] | DFT-s-OFDM (Pre DFT OCC) |

Referring to FIG. 4, format 0 and format 2 may be classified as short PUCCH, and format 1, format 3 and format 4 may be classified as long PUCCH. In the NR system, a transmit diversity scheme for PUCCH and simultaneous transmission of PUSCH and PUCCH may not be supported.

NR Antenna Switching

The NR system can support inter-slot antenna switching and intra-slot antenna switching. In the intra-slot antenna switching, a guard period may be configured.

In 1T2R (1 transmission 2 reception)/2T4R (2 transmission 4 reception), the UE may be configured with two SRS resources consisting of one symbol or two symbols. On the other hand, in 1T4R (1 transmission 4 reception), the UE may be configured with four SRS resources, each of which consists of a single symbol and a single port.

Each port of the configured resource may be associated with a different UE antenna.

Analog Beamforming

Since a wavelength is short in a millimeter wave (mmW), multiple antenna elements can be installed in the same size of area. That is, a wavelength in the frequency band of 30 GHz is 1 cm, and thus a total of 64 (8×8) antenna elements can be installed in two-dimensional arrangement at intervals of 0.5 lambda (i.e., wavelength) on 4×4 (4 by 4) cm panel. Therefore, in the mmW, the coverage can be enhanced or a throughput can be increased by increasing a beamforming (BF) gain using the multiple antenna elements.

In this case, when a transceiver unit (TXRU) is installed so as to adjust transmission power or a phase for each antenna element, independent beamforming is possible for each frequency resource. However, a method for installing the TXRU in all antenna elements (e.g., 100 antenna elements) may be ineffective in terms of cost. As a result, a method for mapping multiple antenna elements to one TXRU and controlling a direction of a beam by using an analog phase shifter may be considered. The aforementioned analog beamforming method may generate only one beam direction in all bands, so that a frequency selective beam operation may not be performed.

As a result, hybrid beamforming with B TXRUs that are fewer than Q antenna elements, in the form of an intermediate form of digital beamforming and analog beamforming, may be considered. In this case, although there is a difference depending on a connection method of B TXRUs and Q antenna elements, the number of directions of the beams that may be transmitted at the same time is limited to B or less.

Hereinafter, representative examples of TXRUs and antenna elements are described with reference to drawings.

FIG. 7 illustrates a transceiver unit model in a wireless communication system to which a method proposed in the present disclosure may be applied.

A TXRU virtualization model indicates a relationship between the output signal of a TXRU and output signals of antenna elements. The TXRU virtualization model may be divided into a TXRU virtualization model option-1: a sub-array partition model, as in FIG. 7(a), and a TXRU virtualization model option-2: a full-connection model, as in FIG. 7(b), depending on a correlation relationship between the antenna elements and the TXRU.

Referring to FIG. 7(a), in the case of the sub-array partition model, the antenna elements are partitioned into multiple antenna element groups, and each TXRU is connected to one of the groups. In this case, the antenna elements are connected to only one TXRU.

Referring to FIG. 7(b), in the case of the full-connection model, the signals of multiple TXRUs are combined and transmitted to a single antenna element (or an array of antenna elements). That is, FIG. 7(b) illustrates a method in which TXRUs are connected to all antenna elements. In this case, the antenna elements are connected to all the TXRUs.

In FIG. 7, q is a transmission signal vector of antenna elements having M co-polarizations within one column. W is a wideband TXRU virtualization weight vector. W indicates a phase vector multiplied by an analog phase shifter. That is, the direction of analog beamforming is determined by W. x is the signal vector of M_TXRU TXRUs.

In this case, mapping between an antenna port and the TXRUs may be 1-to-1 or 1-to-many.

In FIG. 7, the mapping (TXRU-to-element mapping) between the TXRU and the antenna element merely illustrates one example, and the present disclosure is not limited thereto. The present disclosure may be identically applied to mapping between a TXRU and an antenna element which may be implemented in various forms, from the point of view of hardware.

Hybrid Beamforming

In the new RAT system, if multiple antennas are used, a hybrid beamforming scheme in which digital beamforming and analog beamforming have been combined is considered.

In this case, analog beamforming (or radio frequency (RF) beamforming) means an operation of performing precoding (or combining) in an RF stage. In the hybrid beamforming, each of a baseband stage and an RF stage performs precoding (or combining). Accordingly, there are advantages in that the number of RF chains and the number of digital (D)/analog (A) (or A/D) converters can be reduced and performance close to digital beamforming can also be obtained.

The hybrid beamforming structure may be represented as N transceiver units (TXRUs) and M physical antennas. Digital beamforming for L data layers which may be transmitted in a transmission stage may be represented as an N by L matrix. N digital signals that are subsequently transformed are transformed into an analog signal through the TXRUs. Thereafter, analog beamforming represented as an M by N matrix is applied to the analog signal.

FIG. 8 illustrates an example of a hybrid beamforming structure from the point of view of TXRU and physical antenna.

Referring to FIG. 8, it is assumed that the number of digital beams is L, and the number of analog beams is N.

The NR system considers a method of supporting more efficient beamforming for UEs located in a specific region by being designed so that a base station can change analog beamforming on a per symbol basis. In addition, as illustrated in FIG. 8, when N specific TXRUs and M RF antennas are defined as one antenna panel, the NR system considers a method of adopting a plurality of antenna panels to which independent hybrid beamformings are applicable.

As described above, when the base station uses a plurality of analog beams, analog beams that are advantageous for signal reception may be different for each UE. Therefore, a beam sweeping operation is considered, which changes a plurality of analog beams to be applied by the base station on a per symbol basis in a specific subframe (SF) at least with respect to the synchronization signal, system information, paging, etc. so that all the UEs can have a reception opportunity.

FIG. 9 illustrates an example of a beam sweeping operation for a synchronization signal and system information.

Referring to FIG. 9, a physical resource (or physical channel) in which system information is transmitted in a broadcasting manner in the New RAT is called a physical broadcast channel (xPBCH).

In this case, analog beams belonging to different antenna panels within one symbol may be transmitted at the same time. In order to measure a channel according to an analog beam, a method of introducing a beam reference signal (BRS), that is, a reference signal to which a single analog beam (corresponding to a specific antenna panel) is applied and which is transmitted, as illustrated in FIG. 9, is being discussed.

The BRS may be defined with respect to a plurality of antenna ports. Each antenna port of the BRS may correspond to one analog beam.

In this case, unlike the BRS, all analog beams within an analog beam group may be applied to a synchronization signal or xPBCH so that signals transmitted by given UEs are well received, and the synchronization signal or xPBCH may be transmitted.

Sequence Hopping

In a wireless communication system, sequence hopping may be configured based on a group hopping number (or sequence group number) and a sequence hopping number (or base sequence number). The sequence hopping number may refer to a number related to hopping for abase sequence. The sequence hopping is described below by taking as an example of the LTE system.

A root value related to the sequence hopping may be set to be classified into a group hopping number u and a sequence hopping number v, as represented by the following Equation 3.

$$q = \lfloor \bar{q}+1/2 \rfloor + v \cdot (-1)^{\lfloor 2\bar{q} \rfloor}$$

$$\bar{q} = N_{ZC}^{RS} \cdot (u+1)/31 \quad \text{[Equation 3]}$$

In Equation 3, q denotes a root value.

The group hopping number u on a slot $n_s$ may be defined by a group hopping pattern $f_{gh}(n_s)$ and a sequence shift pattern $f_{ss}$ according to the following Equation 4.

$$u = (f_{gh}(n_s) + f_{ss}) \bmod 30 \quad \text{[Equation 4]}$$

In this instance, there may be 17 different hopping patterns and 30 different sequence shift patterns. A sequence group hopping (i.e., group hopping) can be enabled or disabled by means of the cell-specific parameter Group-hopping-enabled provided by higher layers. Sequence-group hopping for PUSCH can be disabled for a certain UE through the higher layer parameter Disable-sequence-group-hopping despite being enabled on a cell basis, unless the PUSCH transmission corresponds to a random access response grant or a retransmission of the same transport block as part of a contention based random access procedure.

The group hopping pattern $f_{gh}(n_s)$ may be different for PUSCH, PUCCH and SRS and may be defined by the following Equation 5.

$$f_{gh}(n_s) = \quad \text{[Equation 5]}$$

$$\begin{cases} 0 & \text{if group hopping is disabled} \\ \left( \sum_{i=0}^{7} c(8n_s+i) \cdot 2^i \right) \bmod 30 & \text{if group hopping is enabled} \end{cases}$$

In Equation 5, c(i) denotes a pseudo-random sequence. A pseudo-random sequence generator may be initialized with an initialization value $C_{init}$ represented in the following Equation 6 at the beginning of each radio frame.

$$c_{init} = \left\lfloor \frac{n_{ID}^{RS}}{30} \right\rfloor \quad \text{[Equation 6]}$$

For SRS, a sequence shift pattern s^SRS_ss may be given by the following Equation 7.

$$f_{ss}^{SRS} = n_{ID}^{RS} \bmod 30 \quad \text{[Equation 7]}$$

The sequence hopping may be applied only when a length of a reference signal corresponds to the following Equation 8.

$$M_{sc}^{RS} \geq 6 N_{sc}^{RB} \quad \text{[Equation 8]}$$

In condition of Equation 8, a base sequence number v within a base sequence group on the slot $n_s$ may be given by the following Equation 9.

$$v = \begin{cases} c(n_s) & \text{if group hopping is disabled and sequence hopping is enabled} \\ 0 & \text{othewise} \end{cases} \quad \text{[Equation 9]}$$

In Equation 9, c(i) denotes a pseudo-random sequence. The parameter Sequence-hopping-enabled provided by higher layers may determine whether or not the sequence hopping is enabled.

On the other hand, in condition of the following Equation 10, the base sequence number v within the base sequence group may be given by v=0.

$$M_{sc}^{RS} < 6 N_{sc}^{RB} \quad \text{[Equation 10]}$$

For SRS, the pseudo-random sequence generator may be initialized with an initialization value $C_{init}$ represented in the following Equation 11 at the beginning of each radio frame.

$$c_{init} = \left\lfloor \frac{n_{ID}^{RS}}{30} \right\rfloor \cdot 2^5 + (n_{ID}^{RS} + \Delta_{ss}) \bmod 30 \quad \text{[Equation 11]}$$

In Equation 11, $\Delta_{ss}$ {0, 1, . . . , 29} may be cell-specifically configured by higher layers. In this case, n^RS_ID may be N—cell_ID.

The pseudo-random sequence may be defined by a length-31 Gold sequence. In this case, an output sequence c(n) of length $M_{PN}$ may be defined by the following Equation 12.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 12]}$$

In Equation 12, $N_C$ is 1600, and a first m-sequence may be initialized with to $x_1(0)=1$ and $x_1(n)=0$, where n is a positive integer of 1 to 30. A second m-sequence may be initialized with a value depending on the application of the sequence and may be given by the following Equation 13.

$$c_{init} = \sum_{i=0}^{30} x_2(i) \cdot 2^i \quad \text{[Equation 13]}$$

Sounding Reference Signal (SRS) Hopping

For the LTE system, a SRS hopping operation may be performed only upon periodic SRS triggering (e.g., triggering type 0). The allocation of SRS resources may be provided according to a predefined hopping pattern. In this case, a hopping pattern may be UE-specifically designated to higher layer signalling (e.g., RRC signalling), and the overlapping cannot be allowed.

The SRS is frequency-hopped using the hopping pattern in each subframe in which the cell-specific and/or UE-specific SRS is transmitted, and a start location on a frequency domain of the SRS hopping and a hopping formula may be interpreted through the following Equation 14.

[Equation 14]

$$k_0^{(p)} = \bar{k}_0^{(p)} + \sum_{b=0}^{B_{SRS}} K_{TC} M_{sc,b}^{RS} n_b$$

$$n_b = \begin{cases} \lfloor 4n_{RRC}/m_{SRS,b}\rfloor \bmod N_b & b \leq b_{hop} \\ \{F_b(n_{SRS}) + \lfloor 4n_{RRC}/m_{SRS,b}\rfloor\} \bmod N_b & \text{otherwise} \end{cases}$$

$$F_b(n_{SRS}) =$$

$$\begin{cases} (N_b/2)\left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \left\lfloor n_{SRS} \Big/ \prod_{b'=b_{hop}}^{b-1} N_{b'} \right\rfloor & \text{if } N_b \text{ odd} \end{cases}$$

$$n_{SRS} = \begin{cases} 2N_{SP}n_f + 2(N_{SP}-1)\left\lfloor \dfrac{n_s}{10} \right\rfloor + \left\lfloor \dfrac{T_{offset}}{T_{offset\_max}} \right\rfloor, & \text{for 2 ms SRS periodicity of frame structure type 2} \\ \lfloor (n_f \times 10 + \lfloor n_s/2 \rfloor)/T_{SRS} \rfloor, & \text{otherwise} \end{cases}$$

In Equation 14, $n_{SRS}$ denotes a hopping ongoing interval on a time domain, $N_b$ denotes the number of branches allocated to tree level b, and b is determined by $B_{SRS}$ configuration in the dedicated RRC.

FIG. 10 illustrates an example of a method of configuring a SRS hopping pattern in the LTE system. More specifically, FIG. 10 illustrates an example of a hopping pattern from slot $n_s=1$ to slot $n_s=4$.

In FIG. 10, it is assumed that $C_{SRS}=1$, $N^{\wedge}UL\_RB=100$, $n_f=1$, and $n_s=1$ via the cell-specific signalling (e.g., cell-specific RRC signalling). Further, for UEs A, B and C, $B_{SRS}$, $b_{hop}$, $n_{RRC}$, and $T_{SRS}$ may be configured via the cell-specific signalling (e.g., cell-specific RRC signalling). More specifically, the UE A may be configured such that $B_{SRS}=1$, $b_{hop}=1$, $n_{RRC}=22$, and $T_{SRS}=10$, the UE B may be configured such that $B_{SRS}=2$, $b_{hop}=0$, $n_{RRC}=10$, and $T_{SRS}=5$, and the UE C may be configured such that $B_{SRS}=3$, $b_{hop}=2$, $n_{RRC}=23$, and $T_{SRS}=2$.

In the LTE system, root values using the group hopping (i.e., sequence group hopping) and the sequence hopping (i.e., base sequence hopping) may be classified according to the above-described method. That is, if the group hopping is enabled, among 30 candidate root values, root values with low correlation, to which different c(n) values scrambled to an identifier (ID) of each cell are applied as the SRS transmission changes, may be configured.

For example, if the group hopping is disabled and the sequence hopping is enabled, a base sequence number in one cell may be configured to 0 by a scrambled value, and a base sequence number of other cell may be configured to 1 after scrambling. In this instance, for fixed $\bar{q}_0, \ldots, \bar{q}_{29}$, a root value (i.e., q value) of one cell (a cell with a base sequence number of 0) may be configured to one value of $\{\bar{q}_0, \ldots, \bar{q}_{29}\}$, and a root value of other cell (a cell with a base sequence number of 1) may be configured to one value of $\{\bar{q}_0+1, \ldots, \bar{q}_{29}+1\}$ In this case, as the SRS transmission changes, the same root value may not be configured between the two cells. However, when a length of the sequence is equal to or greater than 60, the above-described method can be established. Through such a method, inter-cell interference between the SRSs may not occur strongly.

On the other hand, in the NR system, the SRS may be transmitted in the precoded (i.e., beamformed) form, and the cells may be installed more closely than an existing system when a high frequency (e.g., mmWave, etc.) is used as a system carrier.

FIG. 11 illustrates examples of network deployment of an existing system and a NR system. More specifically, (a) of FIG. 11 illustrates a network deployment in the existing system (e.g., LTE system), and (b) of FIG. 11 illustrates a network deployment in the NR system.

Referring to (b) of FIG. 11, the NR system may consider beamforming between a small cell, a base station, and a UE. That is, as illustrated in (b) of FIG. 11, interference between adjacent cells due to other cell may be determined according to beamforming characteristics (e.g., UE Tx beam width, beam direction, beam gain, etc.) of the UE, deployment locations of the cells, locations of precoded SRS transmission UEs deployed in the adjacent cells, and the like.

The SRS transmission in the NR system may be performed based on a method of UE-specifically configuring and using a SRS identifier (ID) (i.e., ID of resource to which the SRS is transmitted) in higher layer. For example, the SRS ID may refer to n^RS_ID used for the group hopping and/or the sequence hopping, and n^RS_ID may be configured for each SRS resource using a SRS-sequence ID in a UE-specific manner.

Considering this, in the NR system, a phenomenon in which the inter-cell interference is randomized may occur.

In consideration of these problems, the present disclosure proposes a method of efficiently configuring group hopping and/or sequence hopping for serving cell UEs using randomization of inter-cell interference (ICI) in line with group hopping configuration and/or sequence hopping configuration for UEs of adjacent cells causing large interference.

The following embodiments described in the present disclosure are merely divided for convenience of explanation, and thus it is apparent that a partial configuration, etc, of any embodiment can be replaced by or combined with configurations, etc. of other embodiments.

First Embodiment

A method may be considered, which configures an initialization value (e.g., $C_{init}$) used for group hopping and sequence hopping for sounding reference signal (SRS) transmission on the network using an identifier (ID) based on a UE group. Using the initialization value thus configured, scrambling for the group hopping and the sequence hopping for the SRS transmission may be performed.

Here, the group hopping may mean sequence hopping between groups and may be referred to as sequence-group hopping, etc. The sequence hopping may mean hopping or shift for a base sequence and may be referred to as base sequence hopping, base sequence shift, etc.

The identifier based on the UE group may refer to an identifier for distinguishing the UE groups, and may correspond to an identifier (e.g., UE group sequence ID) of a sequence allocated to the UE group, and the like. In the present disclosure, the identifier based on the UE group is hereinafter referred to as a UE group sequence ID for convenience of explanation.

The UE group sequence ID may be transmitted to each UE via higher layer signaling (e.g., RRC signalling) in a UE-specific manner. The UE group sequence IDs may be classified as in the following examples, and this classification manner may be predefined.

For example, the UE group sequence IDs may be classified according to uplink (UL) received power. That is, the UE group sequence IDs may be classified according to spatially similar UL received power. The UL received power may mean power at which the base station receives a signal transmitted by the UE. The following Table 5 represents an example of classifying the UE group sequence IDs according to the UL received power.

TABLE 5

| UE Group Sequence ID | UL Received Power |
| --- | --- |
| 0 | −140 dBm~−100 dBm |
| 1 | −100 dBm~−60 dBm |
| 2 | −60 dBm~−20 dBm |
| 3 | −20 dBm~20 dBm |

As another example, the UE group sequence IDs may be classified according to UEs on similar sectors.

FIG. 12 illustrates an example of classifying UE group sequence IDs based on a location of a UE.

Referring to FIG. 12, it is assumed that locations of the UEs supported by the base station are classified according to four sectors. A UE group sequence ID (i.e., gID) #0, a UE group sequence ID #1, a UE group sequence ID #2, and a UE group sequence ID #3 may be configured for the four sectors, respectively. That is, the same UE group sequence ID may be allocated and/or configured to the UEs located on the same sector.

To provide the UE group sequence ID to the UE, a method of using values measured using a downlink reference signal (DL RS), etc. may be considered. That is, as the base station transmits the DL RS to the UE, and the UE transmits feedback information on the corresponding DL RS to the base station, a UE group sequence ID may be determined. The UE group sequence ID determined based on this may be provided to the UE.

In this instance, the corresponding feedback information may be the UE group sequence ID itself, or DL reception RSRP, and/or a SRS resource ID (SRI) of the SRS with a spatial QCL association with the DL RS transmitted by the base station. The base station may be configured to provide the UEs in the corresponding cell with the UE group sequence ID randomly from a corresponding UE group sequence ID set S={gID1, gID2, . . . , gIDm}, as a default value.

A group sequence ID for configuring an initialization value (e.g., $C_{init}$) used for the scrambling of a SRS sequence may include a cell ID. For example, a group sequence ID $n_{groupID}$ may be defined by the following Equation 15.

$$n_{groupID} = gID \times 2^{10} + n_{cellID} \quad \text{[Equation 15]}$$

In Equation 15, gID denotes the above-described UE group sequence ID, $n_{cellID}$ denotes the cell ID (e.g., may consist of 10 bits in the NR system), and $n_{groupID}$ denotes the above-described group sequence ID. In this instance, a relationship represented in the following Equation 16 may be established, and n^SRS_ID denotes a UE-specific sequence ID.

$$n_{SRS}^{ID} = n_{groupID} \quad \text{[Equation 16]}$$

In this case, the above-described initialization value may be defined by the following Equation 17.

$$c_{init} = \lfloor n_{ID}^{SRS} \rfloor \cdot 2^5 + (n_{ID}^{SRS} + \Delta_{ss}) \bmod 30 \quad \text{[Equation 17]}$$

Alternatively, the initialization value used for the scrambling of the SRS sequence may be configured as a combination of the UE-specific sequence ID, the group sequence ID (e.g., 4-bit information), and/or the cell ID. For example, the corresponding initialization value may be defined by the following Equation 18.

$$c_{init} = \lfloor k/30 \rfloor \cdot 2^5 + (k + \Delta_{ss}) \bmod 30$$

$$k = n_{ID}^{SRS} \times 2^{14} + gID \times 2^{10} + n_{cellID} \quad \text{[Equation 18]}$$

Second Embodiment

For each cell, it is assumed that the number of group hopping numbers (i.e., group numbers) u is configured to K, and the number of sequence hopping numbers (i.e., base sequence numbers) v is configured to J. That is, K denotes the number of candidates of the group hopping number, and J denotes the number of candidates of the sequence hopping number.

In this instance, a method of configuring the K value and the J value considering a relationship between the group hopping number and the sequence hopping number and a length of a SRS sequence may be considered.

More specifically, the length of the SRS sequence in each cell may be configured to be equal to or greater than K*J or similar to K*J. That is, the K value and the J value may be configured so that the product of corresponding values is similar to the length of the SRS sequence configured for each cell.

On the contrary, compared to a configured smallest sequence length of a SRS (only for Zadoff-Chu (ZC) sequence), the K value and the J value may be configured so that value of K*J is less than a length of the corresponding sequence. For example, when the configured smallest sequence length of the SRS is 84, the K value may be configured to 40 and the J value may be configured to 2.

In the LTE system, the number of group hopping numbers u may be configured to 30 (i.e., K is 30), and the number of sequence hopping numbers v may be configured up to 2 (i.e., J is 2, {0,1}) when group hopping is disabled. However, only when the length of the sequence is 36 or more (e.g., $M_{ZC} \geq 3N_{sc}^{RB}$ or more), characteristics in which the respective cells have a low correlated root value may be established.

If a length of the SRS sequence configured to the UE in any NR cell is configured to be greater than 36 (e.g., 72 or more, $M_{ZC} \geq 6N_{sc}^{RB}$), the number of group hopping numbers u may be configured to further increase (e.g., K=60), thereby further increasing an inter-cell interference randomization effect. If the group hopping is disabled, a method of differently providing root values that are configurable in each cell may be considered by increasing the number of sequence hopping numbers v (e.g., three, v={0, 1, 2}).

For example, it is assumed that there are three cells (cells A, B and C) on the network. For 30 group hopping numbers (i.e., u={$q_0, q_1, \ldots, q_{29}$}) the cell A may be configured to u={$q_0 q_1, \ldots, q_{29}$}, the cell B may be configured to u={$q_0+1, q_1+1, \ldots, q_{29}+1$}, and the cell C may be configured to u={$q_0+2, q_1+2, \ldots, q_{29}+2$}. That is, the group hopping numbers may be classified among the cells. Hence, an inter-cell interference (ICI) effect between the cells can decrease. However, this may be effective when the smallest length of the sequence (only for ZC sequence) allocated in each cell is considered to be 90 or more.

The network in which the density of the cells is high and which focuses on a reduction in the ICI may prefer a configuration that maximizes the number J of sequence hopping numbers v. For example, when the smallest SRS ZC sequence length in any cell is 84, and there are four cells around a corresponding serving cell, K may be configured to 20, and J may be configured to 4 (i.e., K*J=80<84).

On the other hand, the network in which the density of the cells is low and which does not focus on the ICI and focuses on the SRS transmission support of the more UEs of each cell may prefer a configuration that minimizes the number J of sequence hopping numbers v. For example, when the smallest SRS ZC sequence length in any cell is 72, and there is one cell around a corresponding serving cell, K may be configured to 60, and J may be configured to 1 (i.e., K*J=60<72).

Third Embodiment

As described above, in the existing wireless communication system (e.g., LTE system), the group hopping number and the sequence hopping number were configured only based on a slot index ns.

On the contrary, the NR system may consider a method of configuring a group hopping number and a sequence hopping number additionally considering a symbol index l' as well as a slot index, in order to improve a randomization effect of inter-cell interference. More specifically, this embodiment proposes a method of configuring a specific group hopping pattern function and a specific (base) sequence hopping pattern function in order to configure a group hopping number $u(n_s, l')$ and a sequence hopping number $v(n_s, l')$ for each cell.

In this instance, the specific group hopping pattern function and the specific (base) sequence hopping pattern function may be cell-specifically or UE-specifically provided for each cell. In this case, higher layer signalling (e.g., RRC signalling, MAC-CE), lower layer signalling (e.g., DCI), etc. may be used to provide or configure the corresponding functions between a UE and a base station.

For example, a group hopping pattern function of a cell A may be configured as in the following Equation 19.

$$u_A(n_s, l') = \left( \sum_{i=0}^{7} c(8(N_{symb}^{SRS} \times n_s + l') + i) \cdot 2^i \right) \bmod K_{cellA} \quad \text{[Equation 19]}$$

In Equation 19, $K_{cellA}$ denotes the number of group hopping numbers configured to the cell A, N^SRS_symb denotes the number of symbols for SRS transmission, and c(i) denotes a pseudo-random sequence. In addition, $n_s$ and l' denote a slot index and a symbol index, respectively.

A group hopping pattern function of a cell B may be configured as in the following Equation 20.

$$u_B(n_s, l') = \left( \sum_{i=0}^{7} c(8(N_{symb}^{SRS} \times n_s + l') + i) \cdot 2^i \right) \bmod K_{cellB} \quad \text{[Equation 20]}$$

In Equation 20, $K_{cellB}$ denotes the number of group hopping numbers configured to the cell B, N^SRS_symb denotes the number of symbols for SRS transmission, and c(i) denotes a pseudo-random sequence. In addition, ns and l' denote a slot index and a symbol index, respectively.

In this instance, as methods of configuring the group hopping number and the sequence hopping number considering the slot index and the symbol index, the following methods 1 to 3 may be considered. Methods described below are merely divided for convenience of explanation, and thus it is apparent that a partial configuration of any method can be replaced by or combined with configurations of other methods.

Method 1

In order to configure different group hopping numbers (i.e., group numbers) and different sequence hopping numbers (i.e., base sequence numbers) between cells with large inter-cell interference (ICI), a method may be considered, which classifies and configures a set of group hopping numbers $u(n_s, l')$ and a set of sequence hopping numbers $v(n_s, l')$.

For example, group hopping numbers and sequence hopping numbers of two cells may be differently configured at the same SRS transmission timing by respectively configuring a group hopping number and a sequence hopping number of a corresponding cell to $u_A(n_s,l')$={$u_{A0}, \ldots, u_{A(K-1)}$} and $v_A(n_s,l')$ {$v_{A0}, \ldots, v_{A(J-1)}$} and respectively configuring a group hopping number and a sequence hopping number of a cell causing large interference to $u_B(n_s,l')$={$u_{B0}, \ldots, u_{B(K-1)}$} and $v_B(n_s,l')$ {$v_{B0}, \ldots, v_{B(J-1)}$}. That is, $u_A(n_s,l') \neq u_B(n_s,l')$ and $v_A(n_s,l') \neq v_B(n_s,l')$.

In this instance, the base station may configure the above-described group hopping number set and/or base sequence number set to the UE via higher layer signalling, etc. in a cell-specific or UE-specific manner.

If a group hopping pattern function and/or a sequence hopping pattern function are used, when the UE receives (i.e., is configured to) other values other than a set configured to the UE, SRS transmission for the received group hopping number and/or sequence hopping number may be dropped. In this case, the UE may reuse the group hopping number and/or the sequence hopping number configured at a previous SRS transmission time and may be configured to perform the SRS transmission. That is, the group hopping number and/or the sequence hopping number used at the previous SRS transmission time may be reconfigured.

Method 2

In a state in which group hopping is disabled or off and sequence hopping is enabled or on, a method may be considered, which mutually configures, for each cell, a relation of sequence hopping number sets configured through sequence hopping patterns (i.e., base sequence hopping patterns) $v(n_s, 1')$ of cells with large interference.

That is, in all the sequence hopping numbers $v(n_s,1')=\{v_0, \ldots, v_{(J-1)}\}$, the cell A may be configured as $v_A(n_s,1')=\{v_0, \ldots, v_j\}$, and the cell B may be configured as $v_B(n_s,1')=\{v_{j+1}, \ldots, v_{(J-1)}\}$. Hence, the sequence hopping numbers of the cells have a relation of $v_A(n_s,1') \neq v_B(n_s,1')$. The sequence hopping number set of each cell may be configured via higher layer signalling.

For example, when the number J of all base sequence numbers is configured to 6, the base sequence number set of the cell A may be configured to {0, 1, 3}, and the base sequence number set of the cell B may be configured to {2, 4, 5}. In this instance, in a state in which the group hopping is disabled and the sequence hopping is enabled, root values (i.e., root values for SRS sequence generation) of the two cells may always have different values.

Method 3

In a state in which group hopping is disabled or off and sequence hopping is enabled or on, a method may be considered, which transmits information on sequence hopping patterns between cells with large interference via X2 interface of the corresponding cell. Hence, the sequence hopping numbers (i.e., base sequence numbers) for the cells may be differently configured between the cells.

For example, when the cell A and the cell B mutually receive a large interference effect, the cell A may be configured to transmit its sequence hopping number $v_A(n_s, 1')$ to the cell B via X2 interface, and the cell B may be configured to transmit its sequence hopping number $v_B(n_s, 1')$ to the cell A via X2 interface. Hence, the sequence hopping number of the cell A may be configured as in the following Equation 21, and the sequence hopping number of the cell B may be configured as in the following Equation 22.

$$v_A(n_s,l')=\{v_0, \ldots, v_{J-1}\}/v_B(n_s,l') \quad \text{[Equation 21]}$$

$$v_B(n_s,l')=\{v_00, \ldots, v_{J-1}\}/v_A(n_s,l') \quad \text{[Equation 22]}$$

When a group hopping number (i.e., sequence group hopping number) and a sequence hopping number (i.e., base sequence number) for SRS sequence transmission are configured through the methods described in the present disclosure, there is an advantage in that inter-cell interference can be reduced efficiently and adaptively. A SRS sequence generated based on the group hopping number and the sequence hopping number configured as described above can increase randomization of inter-cell interference and reduce inter-cell interference. That is, the group hopping numbers and the sequence hopping numbers of the respective cells can be flexibly configured according to situations of the network by using the above-described methods.

FIG. 13 is a flow chart illustrating an operation of a UE transmitting a sounding reference signal (SRS) in a wireless communication system to which a method described in the present disclosure is applicable. FIG. 13 is merely a figure for convenience of explanation, and does not limit the range of the present disclosure.

Referring to FIG. 13, it is assumed that a UE and/or a base station transmit and receive a SRS using sequence hopping of the SRS based on the methods described in the above embodiments.

First, the UE may receive, from the base station, configuration information for transmission of the SRS in S1305. The corresponding configuration information may include group hopping information (e.g., the above-described group hopping numbers) and sequence hopping information (e.g., the above-described sequence hopping numbers) for the sequence hopping of the SRS.

Next, the UE may transmit, to the base station, the SRS based on the configuration information in S1310.

According to the above-described method (e.g., second embodiment), a sequence length of the SRS used for the SRS transmission may be based on the product of the number of candidates (e.g., the number K of above-described group hopping numbers) of the group hopping information and the number of candidates (e.g., the number J of above-described sequence hopping numbers) of the sequence hopping information. For example, the product of the number of candidates of the group hopping information and the number of candidates of the sequence hopping information may be similar to the sequence length of the SRS.

In this case, the number of candidates of the group hopping information and the number of candidates of the sequence hopping information may be configured based on the number of neighboring cells of the base station. For example, the number of candidates of the group hopping information and the number of candidates of the sequence hopping information may be configured depending on a density of cells belonging to a network, and the like.

More specifically, the number of candidates of the sequence hopping information configured when the number of neighboring cells of the base station is equal to or greater than a preset value may be configured to be greater than the number of candidates of the sequence hopping information configured when the number of neighboring cells of the corresponding base station is less than a preset value. Further, the number of candidates of the group hopping information configured when the number of neighboring cells of the base station is equal to or greater than the preset value may be configured to be less than the number of candidates of the group hopping information configured when the number of neighboring cells of the corresponding base station is less than a preset value.

According to the above-described method (e.g., first embodiment), the corresponding UE may receive, from the base station, a UE group identifier (ID) (e.g., the above-described UE group sequence ID) related to sequence hopping of the SRS. In this case, an initial value of scrambling sequence for the sequence hopping of the SRS may be configured based on the UE group sequence identifier. The UE group sequence identifier may be configured depending on received power for uplink transmission of the corresponding UE among a plurality of candidates, and a sector of the base station, on which the corresponding UE is located, among the plurality of candidates.

The corresponding UE may receive, from the base station, a specific downlink reference signal (DL RS) and may transmit, to the base station, feedback information generated based on the DL RS. In this case, the above-described UE group identifier may be determined based on the feedback information. The feedback information may be at least one of the UE group identifier, received power measured by the DL RS, and a SRS resource indicator (SRI) related to the DL RS. In particular, the SRS resource indicator may represent resources of the SRS having spatial quasi-co-location (QCL) association with the DL RS.

According to the above-described method (e.g., third embodiment), the group hopping information and the sequence hopping information may be configured based on a group hopping pattern and a sequence hopping pattern according to a slot index and a symbol index. In this case, the group hopping pattern and the sequence hopping pattern may be configured for the corresponding UE via higher layer signaling.

In this regard, the corresponding UE may be implemented as a device illustrated in FIGS. 15 and 16. Considering this, the operation illustrated in FIG. 13 and the UE operation described in the present disclosure may be performed by the device illustrated in FIGS. 15 and 16.

For example, a processor 1521 (and/or a processor 1610) may be configured to receive, from the base station, the configuration information for the SRS transmission (step S1305). The processor 1521 (and/or the processor 1610) may be configured to transmit, to the base station, the SRS based on the configuration information (step S1310).

FIG. 14 is a flow chart illustrating an operation of a UE transmitting a sounding reference signal (SRS) in a wireless communication system to which a method described in the present disclosure is applicable. FIG. 14 is merely a figure for convenience of explanation, and does not limit the range of the present disclosure.

Referring to FIG. 14, it is assumed that a UE and/or a base station transmit and receive a SRS using sequence hopping of the SRS based on the methods described in the above embodiments.

First, the base station may transmit, to the UE, configuration information for transmission of the SRS in S1405. The corresponding configuration information may include group hopping information (e.g., the above-described group hopping numbers) and sequence hopping information (e.g., the above-described sequence hopping numbers) for the sequence hopping of the SRS.

Next, the base station may receive, from the UE, the SRS transmitted based on the configuration information in S1410.

Even in this case, according to the above-described method (e.g., second embodiment), a sequence length of the SRS used for the SRS transmission may be based on the product of the number of candidates (e.g., the number K of above-described group hopping numbers) of the group hopping information and the number of candidates (e.g., the number J of above-described sequence hopping numbers) of the sequence hopping information. For example, the product of the number of candidates of the group hopping information and the number of candidates of the sequence hopping information may be similar to the sequence length of the SRS.

The number of candidates of the group hopping information and the number of candidates of the sequence hopping information may be configured based on the number of neighboring cells of the base station. For example, the number of candidates of the group hopping information and the number of candidates of the sequence hopping information may be configured depending on a density of cells belonging to a network, and the like.

More specifically, the number of candidates of the sequence hopping information configured when the number of neighboring cells of the base station is equal to or greater than a preset value may be configured to be greater than the number of candidates of the sequence hopping information configured when the number of neighboring cells of the corresponding base station is less than a preset value. Further, the number of candidates of the group hopping information configured when the number of neighboring cells of the base station is equal to or greater than the preset value may be configured to be less than the number of candidates of the group hopping information configured when the number of neighboring cells of the corresponding base station is less than a preset value.

According to the above-described method (e.g., first embodiment), the base station may transmit, to the UE, a UE group identifier (ID) (e.g., the above-described UE group sequence ID) related to sequence hopping of the SRS. In this case, an initial value of scrambling sequence for the sequence hopping of the SRS may be configured based on the UE group sequence identifier. The UE group sequence identifier may be configured depending on received power for uplink transmission of the corresponding UE among a plurality of candidates, and a sector of the base station, on which the corresponding UE is located, among the plurality of candidates.

The corresponding base station may transmit, to the UE, a specific downlink reference signal (DL RS) and may receive, from the UE, feedback information generated based on the DL RS. In this case, the above-described UE group identifier may be determined based on the feedback information. The feedback information may be at least one of the UE group identifier, received power measured by the DL RS, and a SRS resource indicator (SRI) related to the DL RS. In particular, the SRS resource indicator may represent resources of the SRS having spatial quasi-co-location (QCL) association with the DL RS.

According to the above-described method (e.g., third embodiment), the group hopping information and the sequence hopping information may be configured based on a group hopping pattern and a sequence hopping pattern according to a slot index and a symbol index. In this case, the base station may configure the group hopping pattern and the sequence hopping pattern to the UE via higher layer signaling.

In this regard, the corresponding base station may be implemented as a device illustrated in FIG. 15. Considering this, the operation illustrated in FIG. 14 and the base station operation described in the present disclosure may be performed by the device illustrated in FIG. 15.

For example, a processor 1511 may be configured to transmit, to the UE, the configuration information for the SRS transmission (step S405). The processor 1511 may be configured to receive, from the UE, the SRS transmitted based on the configuration information (step S1410).

When the UE and/or the base station operate as illustrated in FIGS. 13 and 14, there is an advantage of being able to transmit and receive the SRS while reducing the inter-cell interference efficiently and adaptively.

Overview of Device to which the Present Disclosure is Applicable

FIG. 15 illustrates a block configuration diagram of a wireless communication device to which methods described in the present disclosure are applicable.

Referring to FIG. 15, a wireless communication system includes a base station 1510 and multiple UEs 1520 located in an area of the base station 1510.

The base station 1510 includes a processor 1511, a memory 1512, and a radio frequency (RF) unit 1513. The processor 1511 implements functions, processes, and/or methods described in FIGS. 1 to 14. Layers of radio interface protocol may be implemented by the processor 1511. The memory 1512 is connected to the processor 1511 and stores various types of information for driving the processor

1511. The RF unit 1513 is connected to the processor 1511 and transmits and/or receives radio signals.

For example, as described above, the processor 1511 may control the RF unit 1513 to transmit, to the UE, configuration information for transmission of a SRS. The configuration information may include group hopping information and sequence hopping information for sequence hopping of the SRS. A sequence length of the SRS may be based on the product of the number of candidates of the group hopping information and the number of candidates of the sequence hopping information. The number of candidates of the group hopping information and the number of candidates of the sequence hopping information may be configured based on the number of neighboring cells of the base station.

Next, the processor 1511 may control the RF unit 1513 to receive, from the UE, the SRS transmitted based on the configuration information.

In this case, the number of candidates of the sequence hopping information configured when the number of neighboring cells of the base station is equal to or greater than a preset value may be configured to be greater than the number of candidates of the sequence hopping information configured when the number of neighboring cells of the base station is less than a preset value. Further, the number of candidates of the group hopping information configured when the number of neighboring cells of the base station is equal to or greater than the preset value may be configured to be less than the number of candidates of the group hopping information configured when the number of neighboring cells of the base station is less than a preset value.

The processor 1511 may control the RF unit 1513 to transmit, to the UE, a UE group identifier related to sequence hopping of the SRS. In this case, an initial value of scrambling sequence for the sequence hopping of the SRS may be configured based on the UE group identifier. The UE group identifier may be configured depending on received power for uplink transmission of the UE among a plurality of candidates, and a sector of the base station, on which the UE is located, among the plurality of candidates.

The processor 1511 may control the RF unit 1513 to transmit, to the UE, a specific downlink reference signal and to receive, from the UE, feedback information generated based on the downlink reference signal. In this case, the UE group identifier may be determined based on the feedback information. The feedback information may be at least one of the UE group identifier, received power measured by the downlink reference signal, and a SRS resource indicator (SRI) related to the downlink reference signal. In particular, the SRS resource indicator may represent resources of the SRS having spatial quasi-co-location (QCL) association with the downlink reference signal.

The group hopping information and the sequence hopping information may be configured based on a group hopping pattern and a sequence hopping pattern according to a slot index and a symbol index. The group hopping pattern and the sequence hopping pattern may be configured for the UE via higher layer signaling by the processor 1511 and the RF unit 1513.

The UE 1520 includes a processor 1521, a memory 1522, and a RF unit 1523.

The processor 1521 implements functions, processes, and/or methods described in FIGS. 1 to 14. Layers of radio interface protocol may be implemented by the processor 1521. The memory 1522 is connected to the processor 1521 and stores various types of information for driving the processor 1521. The RF unit 1523 is connected to the processor 1521 and transmits and/or receives radio signals.

For example, as described above, the processor 1521 may control the RF unit 1523 to receive, from the base station, configuration information for transmission of a SRS. The configuration information may include group hopping information and sequence hopping information for sequence hopping of the SRS. A sequence length of the SRS may be based on the product of the number of candidates of the group hopping information and the number of candidates of the sequence hopping information. The number of candidates of the group hopping information and the number of candidates of the sequence hopping information may be configured based on the number of neighboring cells of the base station.

Next, the processor 1521 may control the RF unit 1523 to transmit, to the base station, the SRS based on the configuration information.

In this instance, the number of candidates of the sequence hopping information configured when the number of neighboring cells of the base station is equal to or greater than a preset value may be configured to be greater than the number of candidates of the sequence hopping information configured when the number of neighboring cells of the base station is less than a preset value. Further, the number of candidates of the group hopping information configured when the number of neighboring cells of the base station is equal to or greater than the preset value may be configured to be less than the number of candidates of the group hopping information configured when the number of neighboring cells of the base station is less than a preset value.

The processor 1521 may control the RF unit 1523 to receive, from the base station, a UE group identifier related to sequence hopping of the SRS. In this case, an initial value of scrambling sequence for the sequence hopping of the SRS may be configured based on the UE group identifier. The UE group identifier may be configured depending on received power for uplink transmission of the UE among a plurality of candidates, and a sector of the base station, on which the UE is located, among the plurality of candidates.

The processor 1521 may control the RF unit 1523 to receive, from the base station, a specific downlink reference signal and to transmit, to the base station, feedback information generated based on the downlink reference signal. In this case, the UE group identifier may be determined based on the feedback information. The feedback information may be at least one of the UE group identifier, received power measured by the downlink reference signal, and a SRS resource indicator (SRI) related to the downlink reference signal. In particular, the SRS resource indicator may represent resources of the SRS having spatial quasi-co-location (QCL) association with the downlink reference signal.

The group hopping information and the sequence hopping information may be configured based on a group hopping pattern and a sequence hopping pattern according to a slot index and a symbol index. The group hopping pattern and the sequence hopping pattern may be configured for the UE via higher layer signaling.

The memories 1512 and 1522 may be inside or outside the processors 1511 and 1521 and may be connected to the processors 1511 and 1521 through various well-known means.

For example, in a wireless communication system supporting low latency services, the UE may include a radio frequency (RF) unit for transmitting and receiving a radio signal and a processor functionally connected to the RF unit, in order to transmit and receive downlink (DL) data.

Further, the base station 1510 and/or the UE 1520 may have a single antenna or multiple antennas.

FIG. 16 illustrates a block configuration diagram of a communication device according to an embodiment of the present disclosure.

In particular, FIG. 16 illustrates in more detail the UE illustrated in FIG. 15.

Referring to FIG. 16, the UE may include a processor (or digital signal processor (DSP)) 1610, an RF module (or RF unit) 1635, a power management module 1605, an antenna 1640, a battery 1655, a display 1615, a keypad 1620, a memory 1630, a subscriber identification module (SIM) card 1625 (which is optional), a speaker 1645, and a microphone 1650. The UE may also include a single antenna or multiple antennas.

The processor 1610 implements functions, processes, and/or methods described in FIGS. 1 to 14. Layers of a radio interface protocol may be implemented by the processor 1610.

The memory 1630 is connected to the processor 1610 and stores information related to operations of the processor 1610. The memory 1630 may be inside or outside the processor 1610 and may be connected to the processors 1610 through various well-known means.

A user inputs instructional information, such as a telephone number, for example, by pushing (or touching) buttons of the keypad 1620 or by voice activation using the microphone 1650. The processor 1610 receives and processes the instructional information to perform an appropriate function, such as to dial the telephone number. Operational data may be extracted from the SIM card 1625 or the memory 1630. Further, the processor 1610 may display instructional information or operational information on the display 1615 for the user's reference and convenience.

The RF module 1635 is connected to the processor 1610 and transmits and/or receives a RF signal. The processor 1610 forwards instructional information to the RF module 1635 in order to initiate communication, for example, transmit a radio signal configuring voice communication data. The RF module 1635 consists of a receiver and a transmitter to receive and transmit the radio signal. The antenna 1640 functions to transmit and receive the radio signal. Upon reception of the radio signal, the RF module 1635 may forward a signal to be processed by the processor 1610 and convert the signal into a baseband. The processed signal may be converted into audible or readable information output via the speaker 1645.

FIG. 17 illustrates an example of a RF module of a wireless communication device to which a method described in the present disclosure is applicable.

More specifically, FIG. 17 illustrates an example of an RF module that can be implemented in a frequency division duplex (FDD) system.

First, in a transmission path, the processor described in FIGS. 17 and 18 processes data to be transmitted and provides an analog output signal to a transmitter 1710.

In the transmitter 1710, the analog output signal is filtered by a low pass filter (LPF) 1711 to remove images caused by a digital-to-analog conversion (ADC), is up-converted from a baseband to an RF by an up-converter (mixer) 1712, and is amplified by a variable gain amplifier (VGA) 1713. The amplified signal is filtered by a filter 1714, is additionally amplified by a power amplifier (PA) 1715, is routed through duplexer(s) 1750/antenna switch(es) 1760, and is transmitted through an antenna 1770.

Further, in a reception path, the antenna 1770 receives signals from the outside and provides the received signals, and the signals are routed through the antenna switch(es) 1760/duplexers 1750 and are provided to a receiver 1720.

In the receiver 1720, the received signals are amplified by a low noise amplifier (LNA) 1723, are filtered by a bans pass filter 1724, and are down-converted from the RF to the baseband by a down-converter (mixer) 1725.

The down-converted signal is filtered by a low pass filter (LPF) 1726 and is amplified by a VGA 1727 to obtain an analog input signal, and the analog input signal is provided to the processor described in FIGS. 15 and 16.

Further, a local oscillator (LO) generator 1740 generates transmitted and received LO signals and provides them to each of the up-converter 1712 and the down-converter 1725.

In addition, a phase locked loop (PLL) 1730 receives control information from the processor in order to generate the transmitted and received LO signals at appropriate frequencies and provides control signals to the LO generator 1740.

The circuits illustrated in FIG. 17 may be arranged differently from the configuration illustrated in FIG. 17.

FIG. 18 illustrates another example of a RF module of a wireless communication device to which a method described in the present disclosure is applicable.

More specifically, FIG. 18 illustrates an example of an RF module that can be implemented in a time division duplex (TDD) system.

A transmitter 1810 and a receiver 1820 of the RF module in the TDD system have the same structure as the transmitter and the receiver of the RF module in the FDD system.

Only the structure of the RF module of the TDD system that differs from the RF module of the FDD system will be described below, and the same structure refers to the description of FIG. 17.

A signal amplified by a power amplifier (PA) 1815 of the transmitter 1810 is routed through a band select switch 1850, a band pass filter (BPF) 1860, and antenna switch(es) 1870 and is transmitted via an antenna 1880.

Further, in a reception path, the antenna 1880 receives signals from the outside and provides the received signals, and the signals are routed through the antenna switch(es) 1870, the band pass filter 1860, and the band select switch 1850 and are provided to the receiver 1820.

In the embodiments described above, the components and the features of the present disclosure are combined in a predetermined form. Each component or feature should be considered as an option unless otherwise expressly stated. Each component or feature may be implemented not to be associated with other components or features. Furthermore, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of an implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of an implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

Industrial Applicability

Although the present disclosure has described a method for transmitting and receiving a sounding reference signal in a wireless communication system focusing on examples applying to the 3GPP LTE/LTE-A system and the 5G system (New RAT system), the present disclosure can be applied to various wireless communication systems other than them.

The invention claimed is:

1. A method for receiving, by a base station, a sounding reference signal (SRS) in a wireless communication system, the method comprising:
transmitting, to a user equipment (UE), configuration information for a transmission of the SRS; and
receiving, from the UE, the SRS transmitted based on the configuration information,
wherein the configuration information includes group hopping information and sequence hopping information for a sequence hopping of the SRS,
wherein a sequence length of the SRS is based on a product of a number of candidates of the group hopping information and a number of candidates of the sequence hopping information,
wherein the number of candidates of the group hopping information and the number of candidates of the sequence hopping information are configured based on a number of neighboring cells of the base station.

2. The method of claim 1, wherein the number of candidates of the sequence hopping information configured when the number of neighboring cells of the base station is equal to or greater than a preset value is configured to be greater than the number of candidates of the sequence hopping information configured when the number of neighboring cells of the base station is less than a preset value.

3. The method of claim 2, wherein the number of candidates of the group hopping information configured when the number of neighboring cells of the base station is equal to or greater than the preset value is configured to be less than the number of candidates of the group hopping information configured when the number of neighboring cells of the base station is less than a preset value.

4. The method of claim 1, further comprising transmitting, to the UE, a UE group identifier related to the sequence hopping of the SRS,
wherein an initial value of a scrambling sequence for the sequence hopping of the SRS is configured based on the UE group identifier.

5. The method of claim 4, wherein the UE group identifier is configured depending on a received power for an uplink transmission of the UE among a plurality of candidates.

6. The method of claim 4, wherein the UE group identifier is configured depending on a sector of the base station, on which the UE is located, among a plurality of candidates.

7. The method of claim 4, further comprising:
transmitting, to the UE, a specific downlink reference signal; and
receiving, from the UE, feedback information generated based on the downlink reference signal,
wherein the UE group identifier is determined based on the feedback information.

8. The method of claim 7, wherein the feedback information is at least one of the UE group identifier, a received power measured by the downlink reference signal, and a SRS resource indicator (SRI) related to the downlink reference signal.

9. The method of claim 8, wherein the SRS resource indicator represents a resource of the SRS having a spatial quasi-co-location (QCL) association with the downlink reference signal.

10. The method of claim 1, wherein the group hopping information and the sequence hopping information are respectively configured based on a group hopping pattern and a sequence hopping pattern according to a slot index and a symbol index.

11. The method of claim 10, wherein the group hopping pattern and the sequence hopping pattern are configured for the UE via a higher layer signaling.

12. A base station receiving a sounding reference signal (SRS) in a wireless communication system, the base station comprising:
a radio frequency (RF) unit configured to transmit and receive a radio signal; and
a processor functionally connected to the RF unit,
wherein the processor is configured to:
transmit, to a user equipment (UE), configuration information for a transmission of the SRS; and
receive, from the UE, the SRS transmitted based on the configuration information,
wherein the configuration information includes group hopping information and sequence hopping information for a sequence hopping of the SRS,
wherein a sequence length of the SRS is based on a product of a number of candidates of the group hopping information and a number of candidates of the sequence hopping information,
wherein the number of candidates of the group hopping information and the number of candidates of the sequence hopping information are configured based on a number of neighboring cells of the base station.

13. A user equipment (UE) transmitting a sounding reference signal (SRS) in a wireless communication system, the UE comprising:
a radio frequency (RF) unit configured to transmit and receive a radio signal; and
a processor functionally connected to the RF unit,
wherein the processor is configured to:
receive, from a base station, configuration information for a transmission of the SRS; and
transmit, to the base station, the SRS based on the configuration information,
wherein the configuration information includes group hopping information and sequence hopping information for a sequence hopping of the SRS, wherein a sequence length of the SRS is based on a product of a number of candidates of the group hopping information and a number of candidates of the sequence hopping information, wherein the number of candidates of the group hopping information and the number of candidates of the sequence hopping information are configured based on a number of neighboring cells of the base station.

14. The UE of claim 13, wherein the processor is configured to receive, from the base station, a UE group identifier related to the sequence hopping of the SRS, wherein an initial value of a scrambling sequence for the sequence hopping of the SRS is configured based on the UE group identifier.

15. The UE of claim 13, wherein the group hopping information and the sequence hopping information are respectively configured based on a group hopping pattern and a sequence hopping pattern according to a slot index and a symbol index.

* * * * *